(12) United States Patent
Alshina et al.

(10) Patent No.: US 8,494,296 B2
(45) Date of Patent: Jul. 23, 2013

(54) METHOD AND APPARATUS FOR ENCODING AND DECODING IMAGE BY USING ROTATIONAL TRANSFORM

(75) Inventors: Elena Alshina, Suwon-si (KR); Alexander Alshin, Suwon-si (KR); Vadim Seregin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 12/964,114

(22) Filed: Dec. 9, 2010

(65) Prior Publication Data

US 2011/0135212 A1 Jun. 9, 2011

(30) Foreign Application Priority Data

Dec. 9, 2009 (KR) .................. 10-2009-0121937

(51) Int. Cl.
*G06K 9/36* (2006.01)
*G06K 9/46* (2006.01)

(52) U.S. Cl.
USPC ............................ 382/250; 382/248; 382/232

(58) Field of Classification Search
None
See application file for complete search history.

(56) References Cited

U.S. PATENT DOCUMENTS

| 6,907,079 B2* | 6/2005 | Gomila et al. | 375/240.25 |
| 7,146,053 B1* | 12/2006 | Rijavec et al. | 382/233 |
| 2004/0028227 A1* | 2/2004 | Yu | 380/201 |
| 2007/0025631 A1 | 2/2007 | Kim et al. | |
| 2007/0133889 A1* | 6/2007 | Horie et al. | 382/232 |
| 2007/0237414 A1 | 10/2007 | Cho et al. | |
| 2009/0110317 A1* | 4/2009 | Alshina et al. | 382/250 |

FOREIGN PATENT DOCUMENTS

| KR | 10-2007-0011788 A | 1/2007 |
| KR | 10-2007-0087455 A | 8/2007 |
| WO | 2009051330 A1 | 4/2009 |

OTHER PUBLICATIONS

Ankur Saxena, Felix C. Fernandes "Jointly optimal intra prediction and adaptive primary transform", Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, Document: JCTVC-C108.*

Jingning Han, Saxena, A. ; Rose, K. "Towards jointly optimal spatial prediction and adaptive transform in video/image coding", ICASSP Mar. 2010.*

International Search Report issued Aug. 12, 2011 in corresponding PCT Application No. PCT/KR2010/008818.

* cited by examiner

*Primary Examiner* — Li Liu

(74) *Attorney, Agent, or Firm* — Sughrue Mion, PLLC

(57) ABSTRACT

Disclosed are a method and apparatus for encoding and decoding an image. The image encoding method includes: generating a first frequency coefficient matrix by performing spatial transform (e.g. discrete cosine transform (DCT)) on a current block; determining an angle parameter based on whether the current block is intra or inter predicted; generating a second frequency coefficient matrix by performing a partial switch between at least one of rows and columns of the first frequency coefficient matrix based on the determined angle parameter; and encoding the second frequency coefficient matrix and information about the angle parameter.

18 Claims, 30 Drawing Sheets

CODING UNIT (810)

PREDICTION UNIT (860)

4 x 4 TRANSFORM 8 x 8 TRANSFORM

FIG. 12A

ROT_MATRIX[27][96]=
{

ROT_index = 0

{ 67108864, 0, 0, 0, 0, 67108864, 0, 0, 0, 0, 67108864, 0, 0, 0, 0, 67108864, 0, 0, 0, 0, 67108864, 0, 0, 0, 0,
0, 67108864, 0, 0, 0, 0, 67108864, 0, 0, 0, 0, 67108864, 0, 0, 0, 0, 67108864, 0, 0, 0, 0, 67108864, 0, 0, 0, 0,
67108864, 0, 0, 0, 0, 67108864, 0, 0, 0, 0, 67108864, 0, 0, 0, 0, 67108864, 0, 0, 0, 0, 67108864, 0, 0, 0, 0, 67108864,
67108864, 0, 0, 0, 0, 67108864, 0, 0, 0, 0, 67108864, 0, 0, 0, 0, 67108864, 0, 0, 0, 0, 67108864, 0, 0, 0, 0, 67108864,
0, 0, 0, 0, 67108864, 0, 0, 0, 0, 67108864, },

ROT_index = 1

{ 65120396,-14404904, -7445279, 0,-15665940,-63842560,-13502035, 0, -4184694, 14839991,-
65313576, 0, 0, 0, 0, 67108864, 65506236,-12826692, -6928823, 0,-14278223,-62887816,-18570264, 0, -2943623,
19600982,-64115024, 0, 0, 0, 0, 67108864, 65921888, -9549591, -8167585, 0, 5928666, 62095368,-24751072, 0,
11079492, 23591738, 61840716, 0, 0, 0, 0, 67108864, 61782724,-26185832, 892897, 0, 26144218, 61462352, -
6516063, 0, 1724799, 6346767, 66785800, 0, 0, 0, 0, 67108864, 65921888, -9549591, -8167585, 0, 5928666,
62095368,-24751072, 0, 11079492, 23591738, 61840716, 0, 0, 0, 0, 67108864, 61782724,-26185832, 892897, 0,
26144218, 61462352, -6516063, 0, 1724799, 6346767, 66785800, 0, 0, 0, 0, 67108864, },

ROT_index = 2

ROT_index = 3
{ 62199072, -25090676, -2309256, 0, 23461976, 59915692, -19058998, 0, 9187519, 16857270,
64304136, 0, 0, 0, 67108864, 63729196, -20973680, -1514647, 0, 18469970, 58141160, -27965432, 0, 10052344,
26140198, 60985568, 0, 0, 0, 0, 67108864, 63587200, -21209656, 3227769, 0, 21257612, 60925876, -18432336, 0,
2895130, 18487498, 64447112, 0, 0, 0, 0, 0, 67108864, 66191064, -10810889, -2338348, 0, -11003290, -65804080, -
7235369, 0, -1127301, 7519817, -66676688, 0, 0, 0, 0, 67108864, 63587200, -21209656, 3227769, 0, 21257612,
60925876, -18432336, 0, 2895130, 18487498, 64447112, 0, 0, 0, 0, 0, 67108864, 66191064, -10810889, -2338348,
0, -11003290, -65804080, -7235369, 0, -1127301, 7519817, -66676688, 0, 0, 0, 0, 67108864, }. }

ROT_index = 4
{ 65431788, -4615802, -14176580, 0, -3372992, 57574192, -34313776, 0, 14522533, 34168800,
55903388, 0, 0, 0, 67108864, 55613788, -37487684, 2319558, 0, 35095856, 50390636, -27067784, 0, 13378622,
23644398, 61364116, 0, 0, 0, 0, 67108864, 45570584, -48885096, 6096656, 0, 47569452, 41505612, -22760294, 0,
12808941, 19777042, 62836292, 0, 0, 0, 0, 0, 67108864, 61851816, -25916550, -2507040, 0, -26036388, -61501260, -
6580380, 0, 243706, 7037559, -66738388, 0, 0, 0, 0, 67108864, 45570584, -48885096, 6096656, 0, 47569452,
41505612, -22760294, 0, 12808941, 19777042, 62836292, 0, 0, 0, 0, 0, 67108864, 61851816, -25916550, -2507040,
0, -26036388, -61501260, -6580380, 0, 243706, 7037559, -66738388, 0, 0, 0, 0, 67108864, }. }

ROT_index = 5
{ 51378192, -43133444, -1840461, 0, -42239572, -49630448, -16007397, 0, 8927452, 13413599, -
65145804, 0, 0, 0, 67108864, 65243284, -2292379, -15545379, 0, -6444672, 56646392, -35401296, 0, 14331084,
35910032, 54851516, 0, 0, 0, 0, 67108864, 52843068, -40677204, -7521622, 0, -41099764, -50242636, -17031934, 0,
4692453, 18017830, -64474324, 0, 0, 0, 0, 0, 67108864, 66279352, -4471283, -9521305, 0, -2246443, 53326104, -
40680212, 0, 10276239, 40496100, 52517276, 0, 0, 0, 0, 67108864, 52843068, -40677204, -7521622, 0, -
41099764, -50242636, -17031934, 0, 4692453, 18017830, -64474324, 0, 0, 0, 0, 0, 67108864, 66279352, -4471283, -
9521305, 0, -2246443, 53326104, -40680212, 0, 10276239, 40496100, 52517276, 0, 0, 0, 0, 67108864, }. }

FIG. 12C

ROT_index = 6
{ 65720852, 1288088,-13517027, 0, -6829985, 60875392,-27406890, 0, 11735434, 28215728,
59747404, 0, 0, 0, 0, 67108864, 64298316,-19217858, -17052, 0, 19166084, 64129424, -4865997, 0, 1409763,
4657335, 66932212, 0, 0, 0, 0, 67108864, 59493932,-31030864, 1075675, 0, 30659556, 58344184,-12631197, 0,
4905423, 11689351, 65900648, 0, 0, 0, 0, 67108864, 64908572,-16971322, 1565583, 0, 17029116, 64832208, -
3223917, 0, -697167, 3515485, 67013092, 0, 0, 0, 0, 67108864, 59493932,-31030864, 1075675, 0, 30659556,
58344184,-12631197, 0, 4905423, 11689351, 65900648, 0, 0, 0, 0, 67108864, 64908572,-16971322, 1565583, 0,
17029116, 64832208, -3223917, 0, -697167, 3515485, 67013092, 0, 0, 0, 0, 67108864, }, ROT_index = 7
{ 65921888, -9549591, -8167585, 0, 5928666, 62095368,-24751072, 0, 11079492, 23591738,
61840716, 0, 0, 0, 0, 67108864, 61782724,-26185832, 892897, 0, 26144218, 61462352, -6516063, 0, 1724799,
6346767, 66785800, 0, 0, 0, 0, 67108864, 66716760, -6717631, -2710581, 0, 6320628, 66252112, -8620160, 0,
3538859, 8314500, 66497712, 0, 0, 0, 0, 67108864, 64057860,-19928158, -1748803, 0,-19992818,-63977156, -
3287985, 0, -690812, 3659500,-67005448, 0, 0, 0, 0, 67108864, 66716760, -6717631, -2710581, 0, 6320628,
66252112, -8620160, 0, 3538859, 8314500, 66497712, 0, 0, 0, 0, 67108864, 64057860,-19928158, -1748803,
0,-19992818,-63977156, -3287985, 0, -690812, 3659500,-67005448, 0, 0, 0, 0, 67108864, }, ROT_index = 8
{ 66771012, -383782, -6714517, 0, -6650005,-13776510,-65342064, 0, -1004720, 65678460, -
13745184, 0, 0, 0, 0, 67108864, 64284528,-19211034, 0, -4829302,-11259854,-65981004, 0, 18648788,
63306804,-12168441, 0, 0, 0, 0, 67108864, 62126876,-25259528, -2409859, 0, 4918208, 18240076,-64394960, 0,
24893020, 59437832, 18737170, 0, 0, 0, 0, 67108864, 46965964, 178067, 0, 47934404,-46963144,
-596155, 0, -301218, 544407,-67105980, 0, 0, 0, 0, 67108864, 62126876,-25259528, -2409859, 0, 4918208,
18240076,-64394960, 0, 24893020, 59437832, 18737170, 0, 0, 0, 0, 67108864, 46965964, 47935016, 178067, 0,
47934404,-46963144, -596155, 0, -301218, 544407,-67105980, 0, 0, 0, 0, 67108864, },

FIG. 12D

ROT_index = 9

{ 67108864, 0, 0, 0, 0, 67108864, 0, 0, 0, 0, 0, 0, 67108864, 0, 0, 0, 0, 0, 0, 67108864, 0, 0, 0, 0,
0, 67108864, 0, 0, 0, 0, 67108864, 0, 0, 0, 0, 0, 0, 67108864, 0, 0, 0, 0, 0, 0, 67108864, 0, 0, 0, 0,
67108864, 0, 0, 0, 0, 67108864, 0, 0, 0, 0, 0, 0, 67108864, 0, 0, 0, 0, 0, 0, 67108864, 0, 0, 0, 0,
0, 67108864, 0, 0, 0, 0, 67108864, }.

ROT_index = 10

{ 65120396, -14404904, -7445279, 0, -15665940, -63842560, -13502035, 0, -4184694, 14839991, -
65313576, 0, 0, 0, 67108864, 65506236, -12826692, -6928823, 0, -14278223, -62887816, -18570264, 0, -2943623,
19600982, -64115024, 0, 0, 0, 67108864, 62126876, -25259528, -2409859, 0, 4918208, 18240076, -64394960, 0,
24893020, 59437832, 18737170, 0, 0, 0, 67108864, 46965964, 47935016, 178067, 0, 47934404, -46963144,
-596155, 0, -301218, 544407, -67105980, 0, 0, 0, 67108864, 62126376, -25259528, -2409859, 0, 4918208,
18240076, -64394960, 0, 24893020, 59437832, 18737170, 0, 0, 0, 67108864, 0, 0, 0, 0,
0, 47934404, -46963144, -596155, 0, -301218, 544407, -67105980, 0, 0, 0, 67108864, }.

ROT_index = 11

ROT_index = 12

{ 62199072, -25090676, -2309256, 0, 23461976, 59915692, -19058998, 0, 9187519, 16857270,
64304136, 0, 0, 0, 0, 67108864, 63729196, -20973580, -1514647, 0, 18469970, 58141160, -27965432, 0, 10052344,
26140198, 60985568, 0, 0, 0, 0, 67108864, 45570584, -48885096, 6096666, 0, 47569452, 41505612, -22760294, 0,
12808941, 19777042, 62836292, 0, 0, 0, 0, 67108864, 61851816, -25916550, -2507040, 0, -26036388, -61501260,
-6580380, 0, 243706, 7037559, -66738388, 0, 0, 0, 0, 67108864, 45570584, -48885096, 6096666, 0,
47569452, 41505612, -22760294, 0, 12808941, 19777042, 62836292, 0, 0, 0, 0, 67108864, 61851816, -25916550,
-2507040, 0, -26036388, -61501260, -6580380, 0, 243706, 7037559, -66738388, 0, 0, 0, 0, 67108864, },

ROT_index = 13

{ 65431788, -4615802, -14176580, 0, -3372992, 57574192, -34313776, 0, 14522533, 34168800,
55903388, 0, 0, 0, 67108864, 55613788, -37487684, 2319558, 0, 35095856, 50390636, -27067784, 0, 13378622,
23644398, 61364116, 0, 0, 0, 0, 67108864, 52843068, -40677204, -7521622, 0, -41099764, -50242636, -17031934, 0,
4692453, 18017830, -64474324, 0, 0, 0, 67108864, 66279352, -4471283, -9521305, 0, -2246443, 53326104, -
40680212, 0, 10276239, 40496100, 52517276, 0, 0, 0, 67108864, 52843068, -40677204, -7521622, 0, -
41099764, -50242636, -17031934, 0, 4692453, 18017830, -64474324, 0, 0, 0, 67108864, 66279352, -4471283,
-9521305, 0, -2246443, 53326104, -40680212, 0, 10276239, 40496100, 52517276, 0, 0, 0, 67108864, },

ROT_index = 14

ROT_index = 15
{ 65720852, 1288088,-13517027, 0, -6829985, 60875392,-27406890, 0, 11735434, 28215728,
59747404, 0, 0, 0, 0, 67108864, 64298316,-19217858, -17052, 0, 19166084, 64129424, -4865997, 0, 1409763,
4657335, 66932212, 0, 0, 0, 0, 67108864, 63587200,-21209656, 3227769, 0, 21257612, 60925876,-18432336, 0,
2895130, 18487498, 64447112, 0, 0, 0, 0, 67108864, 66191064,-10810889, -2338348, 0,-11003290,-65804080, -
7235369, 0, -1127301, 7519817,-66676688, 0, 0, 0, 0, 67108864, 63587200,-21209656, 3227769, 0, 21257612,
60925876,-18432336, 0, 2895130, 18487498, 64447112, 0, -1127301, 7519817,-66676688, 6619l064,-10810889, -2338348,
0,-11003290,-65804080,-7255369, 0, 67108864, 0, 0, 0, 0, 67108864, }, ROT_index = 16
{ 65921888, -9549591, -8167585, 0, 5928666, 62095368,-24751072, 0, 11079492, 23591738,
61840716, 0, 0, 0, 0, 67108864, 61782724,-26185832, 892897, 0, 26144218, 61462352, -6516063, 0, 1724799,
6346767, 66785800, 0, 0, 0, 0, 67108864, 59493932,-31030864, 1075675, 0, 30659556, 58344184,-12631197, 0,
4905423, 11689351, 65900648, 0, 0, 0, 0, 67108864, 64908572,-16971322, 1565583, 0, 17029116, 64832208, -
3223917, 0, -697167, 3515485, 67013092, 0, 0, 0, 0, 67108864, 59493932,-31030864, 1075675, 0, 30659556,
58344184,-12631197, 0, 4905423, 11689351, 65900648, 0, -697167, 3515485, 67013092, 64908572,-16971322, 1565583,
0, 17029116, 64832208,-3223917, 0, 67108864, 0, 0, 0, 0, 67108864, }, ROT_index = 17
{ 66771012, -383782, -6714517, 0, -6650005,-13776510,-65342064, 0, -1004720, 65678460,-
13745184, 0, 0, 0, 0, 67108864, 64284528,-19211034, 0, -4829302,-11259854,-65981004, 0, 18648788,
63306804,-12168441, 0, 0, 0, 0, 67108864, 66716760, -6717631, -2710581, 0, 6320628, 66252112, -8620160, 0,
3538859, 8314500, 66497712, 0, 0, 0, 0, 67108864, 64057860,-19928158, -1748803, 0,-19992818,-63977156, -
3287985, 0, -690812, 3659500,-67005448, 0, 0, 0, 0, 67108864, 66716760, -6717631, -2710581, 0, 6320628,
66252112, -8620160, 0, 3538859, 8314500, 66497712, 0, -690812, 3659500,-67005448, 64057860,-19928158, -1748803,
0,-19992818,-63977156,-3287985, 0, 67108864, 0, 0, 0, 0, 67108864, },

FIG. 12G

ROT_index = 18
{ 67108864, 0, 0, 0, 0, 0, 0, 0, 0, 0, 0, 0, 0, 0, 0, 0,
0, 67108864, 0, 0, 0, 0, 0, 0, 0, 0, 0, 0, 0, 0, 0, 0,
67108864, 0, 0, 0, 0, 67108864, 0, 0, 0, 0, 0, 0, 0, 0, 0, 0,
67108864, 0, 0, 0, 0, 67108864, 0, 0, 0, 0, 0, 0, 67108864, 0, 0, 0,
0, 67108864, 0, 0, 0, 0, 67108864, 0, 0, 0, 0, 0, 0, 67108864, 0, 0,
0, 0, 67108864, 0, 0, 0, 0, 67108864, 0, 0, 0, 0, 0, 0, 67108864, 0,
0, 0, 0, 67108864, 0, 0, 0, 0, 67108864, 0, 0, 0, 0, 0, 0, 67108864, }

ROT_index = 19
{ 65120396,-14404904, -7445279, 0,-15665940,-63842560,-13502035, 0, -4184694, 14839991,-
65313576, 0, 0, 0, 0, 67108864, 65506236,-12826692, -6928823, 0,-14278223,-62887816,-18570264, 0, -2943623,
19600982,-64115024, 0, 0, 0, 0, 67108864, 45570584,-48885096, 6096666, 0, 47569452, 41505612,-22760294, 0,
12808941, 19777042, 62836292, 0, 0, 0, 0, 67108864, 61851816,-25916550, -2507040, 0,-26036388,-61501260,
-6580380, 0, 243706, 7037559,-66738388, 0, 0, 0, 0, 67108864, 45570584,-48885096, 6096666, 0,
47569452, 41505612,-22760294, 0, 12808941, 19777042, 62836292, 0, 0, 0, 0, 67108864, 61851816,-25916550,
-2507040, 0,-26036388,-61501260, -6580380, 0, 243706, 7037559,-66738388, 0, 0, 0, 0, 67108864, }

ROT_index = 20
{ 66831944, 5754485, -1994019, 0, -5873764, 66709580, -4350896, 0, 1609069, 4507468,
66937976, 0, 0, 0, 0, 67108864, 63201476,-22055710, -4761730, 0, 18044674, 57905836,-28721138, 0, 13548521,
25763502, 60465048, 0, 0, 0, 0, 67108864, 52843068,-40677204, -7521622, 0,-41099764,-50242636,-17031934, 0,
4692453, 18017830,-64474324, 0, 0, 0, 0, 67108864, 66279352, -4471283, -9521305, 0, -2246443, 53326104,-
40680212, 0, 10276239, 40496100, 52517276, 0, 0, 0, 0, 67108864, 52843068,-40677204, -7521622, 0,-
41099764,-50242636,-17031934, 0, 4692453, 18017830,-64474324, 0, 0, 0, 0, 67108864, 66279352, -4471283,
-9521305, 0, -2246443, 53326104,-40680212, 0, 10276239, 40496100, 52517276, 0, 0, 0, 0, 67108864, }

FIG. 12H

ROT_index = 21

```
{ 62199072,-25090676,        0,       -2309256,       0,   23461976,   59915692,-19058998,       0,    9187519,   16857270,
 64304136,        0,       0,       0,  67108864,  63729196,-20973680,   -1514647,       0,   18469970,  58141160,-27965432,       0,  10052344,
 26140198, 60985568,        0,       0,       0,       0,  67108864,  65921888,  -9549591,  -8167585,       0,    5928666,  62095368,-24751072,       0,
 11079492, 23591738, 61840716,        0,       0,       0,       0,       0,  67108864,  61782724,-26185832,     892897,       0,   26144218,  61462352,
 -6516063,        0,  1724799,   6346767,  66785800,       0,       0,       0,       0,       0,  67108864,      65921888,   -9549591,  -8167585,       0,
  5928666, 62095368,-24751072,        0,  11079492,  23591738,  61840716,       0,       0,       0,       0,  67108864,  61782724,-26185832,
   892897,        0, 26144218,  61462352,  -6516063,       0,   1724799,   6346767,  66785800,       0,       0,       0,       0,       0,   67108864,},
```

ROT_index = 22

```
{   65431788,  -4615802,-14176580,       0,  -3372992,  57574192,-34313776,        0,  14522533,   34168800,
 55903338,        0,       0,       0,  67108864,  55613788,-37487684,   2319558,       0,  35095856,  50390636,-27067784,       0,  13378622,
 23644398, 61364116,        0,       0,       0,       0,  67108864,  63818416,-16095363,-13105287,       0,-19695116,-60332156,-21811300,       0,
 -6550691, 24587996,-62097652,        0,       0,       0,       0,       0,  67108864,  66558580,  -7075509,  -4846891,       0,    5865315,  65222876,-
 14668817,        0,  6257258,  14124913,  65306456,       0,       0,       0,       0,       0,  67108864,  63818416,-16095363,-13105287,       0,-
 19695116,-60332156,-21811300,        0,  -6550691,  24587996,-62097652,       0,       0,       0,       0,  67108864,  66558580,  -7075509,
 -4846891,        0,  5865315,  65222876,-14668817,       0,   6257258,  14124913,  65306456,       0,       0,       0,       0,       0,  67108864,},
```

ROT_index = 23

ROT_index = 24

{ 65720852, 1288088, -13517027, 0, -6829985, 60875392, -27406890, 0, 11735434, 28215728,
59747404, 0, 0, 0, 0, 67108864, 0, 0, 0, 0, -17052, 0, 19166084, 64129424, -4865997, 0, 1409763,
4657335, 66932212, 0, 0, 0, 0, 0, 67108864, 59493932, -31030864, 1075675, 0, 30659556, 58344184, -12631197, 0,
4905423, 11689351, 65900648, 0, 0, 0, 0, 0, 67108864, 64908572, -16971322, 1565583, 0, 17029116, 64832208, -
3223917, 0, -697167, 3515485, 67013092, 0, 0, 0, 0, 0, 67108864, 59493932, -31030864, 1075675, 0, 30659556,
58344184, -12631197, 0, 4905423, 11689351, 65900648, -3223917, 0, -697167, 3515485, 65900648, 64908572, -16971322, 1565583,
0, 17029116, 64832208, 0, 0, 0, 0, 0, 67108864, },

ROT_index = 25

{ 65921888, -9549591, -8167585, 0, 5928666, 62095368, -24751072, 0, 11079492, 23591738,
61840716, 0, 0, 0, 0, 67108864, 61782724, -26185832, 892897, 0, 26144218, 61462352, -6516063, 0, 1724799,
6346767, 66785800, 0, 0, 0, 0, 0, 67108864, 66716760, -6717631, -2710581, 0, 6320628, 66252112, -8620160, 0,
3538859, 8314500, 66497712, 0, 0, 0, 0, 0, 67108864, 64057860, -19928158, -1748803, 0, -19992818, -63977156, -
3287985, 0, -690812, 3659500, -67005448, 0, 0, 0, 0, 0, 67108864, 66716760, -6717631, -2710581, 0, 6320628,
66252112, -8620160, 0, 3538859, 8314500, 66497712, 0, -690812, 3659500, -67005448, 64057860, -19928158, -1748803,
0, -19992818, -63977156, 0, 0, 0, 0, 0, 67108864, },

ROT_index = 26

{ 66771012, -383782, -6714517, 0, -6650005, -13776510, -65342064, 0, -1004720, 65578460, -
13745184, 0, 0, 0, 0, 67108864, 64284528, -19211034, 0, -4829302, -11259854, -65981004, 0, 18648788,
63306804, -12168441, 0, 0, 0, 0, 0, 67108864, 62126876, -25259528, -2409859, 0, 4918208, 18240076, -64394960, 0,
24893020, 59437832, 18737170, 0, 0, 0, 0, 0, 67108864, 46965964, 47935016, 178067, 0, 47934404, -46963144,
-596155, 0, -301218, 544407, -67105980, 0, 0, 0, 0, 0, 67108864, 62126876, -25259528, -2409859, 0, 4918208,
18240076, -64394960, 0, 24893020, 59437832, 18737170, 0, 0, 0, 67108864, 46965964, 47935016, 178067,
0, 47934404, -46963144, -596155, 0, -301218, 544407, -67105980, 0, 0, 0, 0, 0, 67108864, }
}

FIG. 13A for (n=0;n<13;n+4){ temp[n]=ROT_MATRIX[ROT_index][16]*(r[n/4,n%4]/ROT_SCALE)+

ROT_MATRIX[ROT_index][20]*(r[(n+1)/4,(n+1)%4]/ROT_SCALE)+

ROT_MATRIX[ROT_index][24]*( r[(n+2)/4,(n+2)%4]/ROT_SCALE)

temp[n+1]=ROT_MATRIX[ROT_index][17]*(r[n/4,n%4]/ROT_SCALE)+

ROT_MATRIX[ROT_index][21]*(r[(n+1)/4,(n+1)%4]/ROT_SCALE)+

ROT_MATRIX[ROT_index][25]*( r[(n+2)/4,(n+2)%4]/ROT_SCALE)

temp[n+2]=ROT_MATRIX[ROT_index][18]*(r[n/4,n%4]/ROT_SCALE)+

ROT_MATRIX[ROT_index][22]*(r[(n+1)/4,(n+1)%4]/ROT_SCALE)+

ROT_MATRIX[ROT_index][26]*( r[(n+2)/4,(n+2)%4]/ROT_SCALE)

temp[n+3]= r[(n+3)/4,(n+3)%4]

} for (n=0;n<4;n++){ r'[n/4,n%4]=ROT_MATRIX[ROT_index][0]*(temp[n]/ROT_SCALE)+

ROT_MATRIX[ROT_index][4]*(temp[n+4]/ROT_SCALE)+

ROT_MATRIX[ROT_index][8]*( temp[n+8]/ROT_SCALE)

r'[(n+4)/4,(n+4)%4]=ROT_MATRIX[ROT_index][1]*(temp[n]/ROT_SCALE)+

ROT_MATRIX[ROT_index][5]*(temp[n+4]/ROT_SCALE)+

ROT_MATRIX[ROT_index][9]*( temp[n+8]/ROT_SCALE)

r'[(n+8)/4,(n+8)%4]=ROT_MATRIX[ROT_index][2]*(temp[n]/ROT_SCALE)+

ROT_MATRIX[ROT_index][6]*(temp[n+4]/ROT_SCALE)+

ROT_MATRIX[ROT_index][10]*( temp[n+8]/ROT_SCALE)

r'[(n+12)/4,(n+12)%4]= temp[n+12];

```
for (n=0;n<64;n+=8){
temp[n]=ROT_MATRIX[ROT_index][48]*(r[n/8,n%8]/ROT_SCALE)-
ROT_MATRIX[ROT_index][52]*(r[(n+1)/8,(n+1)%8]/ROT_SCALE)+
ROT_MATRIX[ROT_index][56]*(r[(n+2)/8,(n+2)%8]/ROT_SCALE)
temp[n+1]=ROT_MATRIX[ROT_index][49]*(r[n/8,n%8]/ROT_SCALE)+
ROT_MATRIX[ROT_index][53]*(r[(n+1)/8,(n+1)%8]/ROT_SCALE)+
ROT_MATRIX[ROT_index][57]*(r[(n+2)/8,(n+2)%8]/ROT_SCALE)
temp[n+2]=ROT_MATRIX[ROT_index][50]*(r[n/8,n%8]/ROT_SCALE)+
ROT_MATRIX[ROT_index][54]*(r[(n+1)/8,(n+1)%8]/ROT_SCALE)+
ROT_MATRIX[ROT_index][58]*(r[(n+2)/8,(n+2)%8]/ROT_SCALE)
temp[n+3]=ROT_MATRIX[ROT_index][80]*(r[(n+3)/8,(n+3)%8]/ROT_SCALE)+
ROT_MATRIX[ROT_index][84]*(r[(n+4)/8,(n+4)%8]/ROT_SCALE)+
ROT_MATRIX[ROT_index][88]*(r[(n+5)/8,(n+5)%8]/ROT_SCALE)
temp[n+4]=ROT_MATRIX[ROT_index][81]*(r[(n+3)/8,(n+3)%8]/ROT_SCALE)+
ROT_MATRIX[ROT_index][85]*(r[(n+4)/8,(n+4)%8]/ROT_SCALE)+
ROT_MATRIX[ROT_index][89]*(r[(n+5)/8,(n+5)%8]/ROT_SCALE)
temp[n+5]=ROT_MATRIX[ROT_index][82]*(r[(n+3)/8,(n+3)%8]/ROT_SCALE)+
ROT_MATRIX[ROT_index][86]*(r[(n+4)/8,(n+4)%8]/ROT_SCALE)+
ROT_MATRIX[ROT_index][90]*(r[(n+5)/8,(n+5)%8]/ROT_SCALE)
temp[n+6]=r[(n+6)/8,(n+6)%8]
temp[n+7]=r[(n+7)/8,(n+7)%8]
}
for (n=0;n<8;n++){
r'[n/8,n%8]=ROT_MATRIX[ROT_index][32]*(temp[n]/ROT_SCALE)+
ROT_MATRIX[ROT_index][36]*(temp[n+8]/ROT_SCALE)+
ROT_MATRIX[ROT_index][40]*(temp[n+16]/ROT_SCALE)
r'[(n+8)/8,(n-8)%8]=   ROT_MATRIX[ROT_index][33]*(temp[n]/ROT_SCALE)+
ROT_MATRIX[ROT_index][37]*(temp[n+8]/ROT_SCALE)+
ROT_MATRIX[ROT_index][41]*(temp[n+16]/ROT_SCALE)
r'[(n+16)/8,(n-16)%8]= ROT_MATRIX[ROT_index][34]*(temp[n]/ROT_SCALE)+
ROT_MATRIX[ROT_index][38]*(temp[n+8]/ROT_SCALE)+
ROT_MATRIX[ROT_index][42]*(temp[n+16]/ROT_SCALE)
r'[(n+24)/8,(n-24)%8]= ROT_MATRIX[ROT_index][64]*(temp[n+24]/ROT_SCALE)+
ROT_MATRIX[ROT_index][68]*(temp[n+32/ROT_SCALE)+
ROT_MATRIX[ROT_index][72]*(temp[n+40]/ROT_SCALE)
d'[(n+32)/8,(n+32)%8]= ROT_MATRIX[ROT_index][65]*(temp[n+24]/ROT_SCALE)+
ROT_MATRIX[ROT_index][69]*(temp[n+32]/ROT_SCALE)+
ROT_MATRIX[ROT_index][73]*(temp[n+40]/ROT_SCALE)
r'[(n+40)/8,(n+40)%8]= ROT_MATRIX[ROT_index][66]*(temp[n+24]/ROT_SCALE)+
ROT_MATRIX[ROT_index][70]*(temp[n+32]/ROT_SCALE)+
ROT_MATRIX[ROT_index][74]*(temp[n+40]/ROT_SCALE)
r'[(n+48)/8,(n+48)%8]=temp[n+48]
r'[(n+56)/8,(n+56)%8]=temp[n+56]
}
```

FIG. 20A

|    | idx = 0 | idx = 1 | idx = 2 | idx = 3 |
|----|---------|---------|---------|---------|
| 0  | 248     | 255     | 237     | 250     |
| 1  | −55     | 22      | −96     | −18     |
| 2  | −28     | −8      | −9      | −54     |
| 3  | −60     | −22     | 90      | −13     |
| 4  | −244    | 254     | 229     | 220     |
| 5  | −52     | −17     | −73     | −131    |
| 6  | −16     | 6       | 35      | 55      |
| 7  | 57      | 17      | 64      | 130     |
| 8  | −249    | 255     | 245     | 213     |
| 9  | 250     | 241     | 243     | 212     |
| 10 | −49     | −84     | −80     | −143    |
| 11 | −26     | −18     | −6      | 9       |
| 12 | −54     | 69      | 70      | 134     |
| 13 | −240    | 221     | 222     | 192     |
| 14 | −71     | −110    | −107    | −103    |
| 15 | −11     | 52      | 38      | 51      |
| 16 | 75      | 98      | 100     | 90      |
| 17 | −245    | 231     | 233     | 234     |

FIG. 20B

|    | idx = 0 | idx = 1 | idx = 2 | idx = 3 |
|----|---------|---------|---------|---------|
| 0  | 251     | 243     | 243     | 174     |
| 1  | −36     | −61     | −81     | −186    |
| 2  | −31     | −50     | 12      | 23      |
| 3  | 23      | −75     | 81      | 181     |
| 4  | 237     | −230    | 232     | 158     |
| 5  | −94     | −83     | −70     | −87     |
| 6  | 42      | −25     | 11      | 49      |
| 7  | 90      | 94      | 71      | 75      |
| 8  | 236     | −237    | 246     | 240     |
| 9  | 236     | 254     | 252     | 236     |
| 10 | −100    | −27     | −41     | −99     |
| 11 | 3       | −18     | −9      | −10     |
| 12 | 100     | 22      | −42     | −99     |
| 13 | 234     | 249     | −251    | −235    |
| 14 | −25     | −56     | −28     | −25     |
| 15 | 7       | 24      | −4      | 1       |
| 16 | 24      | 54      | 29      | 27      |
| 17 | 255     | 249     | −254    | −255    |
| 18 | 251     | 243     | 243     | 174     |
| 19 | −36     | −61     | −81     | −186    |
| 20 | −31     | −50     | 12      | 23      |
| 21 | 23      | −75     | 81      | 181     |
| 22 | 237     | −230    | 232     | 158     |
| 23 | −94     | −83     | −70     | −87     |
| 24 | 42      | −25     | 11      | 49      |
| 25 | 90      | 94      | 71      | 75      |
| 26 | 236     | −237    | 246     | 240     |
| 27 | 236     | 254     | 252     | 236     |
| 28 | −100    | −27     | −41     | −99     |
| 29 | 3       | −18     | −9      | −10     |
| 30 | 100     | 22      | −42     | −99     |
| 31 | 234     | 249     | −251    | −235    |
| 32 | −25     | −56     | −28     | −25     |
| 33 | 7       | 24      | −4      | 1       |
| 34 | 24      | 54      | 29      | 27      |
| 35 | 255     | 249     | −254    | −255    |

FIG. 21A

```
for (j=0; j<4; j++) {
t_{i,j}     = INV_ROT_4[idx][9]*s_{i,j} + INV_ROT_4[idx][12]*s_{i+1,j} + INV_ROT_4[idx][15]*s_{i+2,j}
t_{i+1,j}   = INV_ROT_4[idx][10]*s_{i,j}+ INV_ROT_ 4[idx][13]*s_{i+1,j}+ INV_ROT_4[idx][16]*s_{i+2,j}
t_{i+2,j}   = INV_ROT_ 4[idx][11]*s_{i,j}+ INV_ROT_4[idx][14]*s_{i+1,j}+ INV_ROT_4[idx][17]*s_{i+2,j}
t_{i,j}     = Sign( t_{i,j} )*(Abs( t_{i,j} ) >> ( 8-Shift ) )
t_{i+1,j}   = Sign( t_{i+1,j} )*( Abs( t_{i+1,j} ) >> ( 8-shift ) )
t_{i+2,j}   = Sign( t_{i+2,j} )*( Abs( t_{i+2,j} ) >> ( 8-shift ) )
t_{i+3,j}   = s_{i+3,j} << shift
}
for (i=0; i<4; i++) {
d_{i,j}     = INV_ROT_4[idx][0]*t_{i,j} + INV_ROT_4[idx][3]*t_{i,j+1}+ INV_ROT_4[idx][6]*t_{i,j+2}
d_{i,j+1}   = INV_ROT_4[idx][1]*t_{i,j} + INV_ROT_4[idx][4]*t_{i,j+1}+ INV_ROT_4[idx][7]*t_{i,j+2}
d_{i,j+2}   = INV_ROT_4[idx][2]*t_{i,j} + INV_ROT_4[idx][5]*t_{i,j+1} + INV_ROT_4[idx][8]*t_{i,j+2}
d_{i,j+3}   = t_{i, j+3}
d_{i,j}     = Sign( d_{ij} )*( ( Abs( d_{ij} ) + ( offset << 8 ) ) >> ( 8+ shift ) )
d_{i,j+1}   = Sign( d_{i,j+1})*( ( Abs( d_{i,j+1} ) + ( offset << 8 ) ) >> ( 8+ shift ) )
d_{i,j+2}   = Sign( d_{i,j+2} )*( ( Abs( d_{i,j+2} ) + ( offset << 8 ) ) >> ( 8+ shift ) )
d_{i,j+3}   = Sign(d_{i,j+3} )*( ( Abs( d_{i,j+3} ) + offset ) >> shift )
}
```

FIG. 21B

```
for (j=0; j<4; j++) {
    t_{i,j}   = INV_ROT_8[idx][9 ]*s_{i,j} + INV_ROT_8[idx][12]*s_{i+1,j} + INV_ROT_8[idx][15]*s_{i+2,j}
    t_{i+1,j} = INV_ROT_8[idx][10]*s_{i,j} + INV_ROT_8[idx][13]*s_{i+1,j} + INV_ROT_8[idx][16]*s_{i+2,j}
    t_{i+2,j} = INV_ROT_8[idx][11]*s_{i,j} + INV_ROT_8[idx][14]*s_{i+1,j} + INV_ROT_8[idx][17]*s_{i+2,j}
    t_{i+3,j} = INV_ROT_8[idx][27]*s_{i+3,j} + INV_ROT_8[idx][30]*s_{i+4,j} + INV_ROT_8[idx][33]*s_{i+5,j}
    t_{i+4,j} = INV_ROT_8[idx][28]*s_{i+3,j} + INV_ROT_8[idx][31]*s_{i+4,j} + INV_ROT_8[idx][34]*s_{i+5,j}
    t_{i+5,j} = INV_ROT_8[idx][29]*s_{i+3,j} + INV_ROT_8[idx][32]*s_{i+4,j} + INV_ROT_8[idx][35]*s_{i+5,j}
    t_{i,j}   = Sign( t_{i,j}   )*( Abs( t_{i,j}   ) >> ( 8-shift ) )
    t_{i+1,j} = Sign( t_{i+1,j} )*( Abs( t_{i+1,j} ) >> ( 8-shift ) )
    t_{i+2,j} = Sign( t_{i+2,j} )*( Abs( t_{i+2,j} ) >> ( 8-shift ) )
    t_{i+3,j} = Sign( t_{i+3,j} )*( Abs( t_{i+3,j} ) >> ( 8-shift ) )
    t_{i+4,j} = Sign( t_{i+4,j} )*( Abs( t_{i+4,j} ) >> ( 8-shift ) )
    t_{i+5,j} = Sign( t_{i+5,j} )*( Abs( t_{i+5,j} ) >> ( 8-shift ) )
    t_{i+6,j} = s_{i+6,j} << shift
    t_{i+7,j} = s_{i+7,j} << shift
}
for (i=0; i<4; i++) {
    d_{i,j}   = INV_ROT_8[idx][0] * t_{i,j} + INV_ROT_8[index][3] * t_{i,j+1} + INV_ROT_8[idx][6] * t_{i,j+2}
    d_{i,j+1} = INV_ROT_8[idx][1] * t_{i,j} + INV_ROT_8[index][4] * t_{i,j+1} + INV_ROT_8[idx][7] * t_{i,j+2}
    d_{i,j+2} = INV_ROT_8[idx][2] * t_{i,j} + INV_ROT_8[index][5] * t_{i,j+1} + INV_ROT_8[idx][8] * t_{i,j+2}
    d_{i,j+3} = INV_ROT_8[idx][18] * t_{i,j+3} + INV_ROT_8[idx][21] * t_{i,j+4} + INV_ROT_8[idx][24] * t_{i,j+5}
    d_{i,j+4} = INV_ROT_8[idx][19] * t_{i,j+3} + INV_ROT_8[idx][22] * t_{i,j+4} + INV_ROT_8[idx][25] * t_{i,j+5}
    d_{i,j+5} = INV_ROT_8[idx][20] * t_{i,j+3} + INV_ROT_8[idx][23] * t_{i,j+4} + INV_ROT_8[idx][26] * t_{i,j+5}
    d_{i,j+6} = t_{i,j+6}
    d_{i,j+7} = t_{i,j+7}
    d_{i,j}   = Sign( d_{i,j}   )*( ( Abs( d_{i,j}   ) + ( offset << 8 ) ) >> ( 8+shift ) )
    d_{i,j+1} = Sign( d_{i,j+1} )*( ( Abs( d_{i,j+1} ) + ( offset << 8 ) ) >> ( 8+shift ) )
    d_{i,j+2} = Sign( d_{i,j+2} )*( ( Abs( d_{i,j+2} ) + ( offset << 8 ) ) >> ( 8+shift ) )
    d_{i,j+3} = Sign( d_{i,j+3} )*( ( Abs( d_{i,j+3} ) + ( offset << 8 ) ) >> ( 8+shift ) )
    d_{i,j+4} = Sign( d_{i,j+4} )*( ( Abs( d_{i,j+4} ) + ( offset << 8 ) ) >> ( 8+shift ) )
    d_{i,j+5} = Sign( d_{i,j+5} )*( ( Abs( d_{i,j+5} ) + ( offset << 8 ) ) >> ( 8+shift ) )
    d_{i,j+6} = Sign( d_{i,j+6} )*( ( Abs( d_{i,j+6} ) + offset ) >> shift )
    d_{i,j+7} = Sign( d_{i,j+7} )*( ( Abs( d_{i,j+7} ) + offset ) >> shift )
}
```

METHOD AND APPARATUS FOR ENCODING AND DECODING IMAGE BY USING ROTATIONAL TRANSFORM

CROSS-REFERENCE TO RELATED PATENT APPLICATION

This application claims priority from Korean Patent Application No. 10-2009-0121937, filed on Dec. 9, 2009 in the Korean Intellectual Property Office, the disclosure of which is incorporated herein in its entirety by reference.

BACKGROUND

1. Field

Exemplary embodiments relate to a method and apparatus for encoding and decoding an image, and more particularly, to a method and apparatus for encoding and decoding coefficients generated by transforming an image from a pixel domain to a frequency domain.

2. Description of the Related Art

In related art methods and apparatuses for encoding and decoding an image, an image of a pixel domain is transformed to a frequency domain and then is encoded to compress the image. Discrete cosine transform (DCT) is a related art technology used to compress audio/video (AV) data. In recent years, many attempts to find more efficient coding methods have been made. In audio coding, parametric coding performs better than DCT and, in two-dimensional data, Karhunen Loeve transform (KLT) has a minimum bit size but has a large overhead size.

SUMMARY

One or more exemplary embodiments provide a method and apparatus for encoding and decoding an image, and a computer readable recording medium having recorded thereon a computer program for executing the method.

According to an aspect of an exemplary embodiment, there is provided method of encoding an image, the method including: generating a first frequency coefficient matrix by performing discrete cosine transform (DCT) on a current block; determining angle parameters based on whether the current block is intra predicted; generating a second frequency coefficient matrix by performing a partial switch between at least one of rows and columns of the first frequency coefficient matrix based on the determined angle parameters; quantizing the second frequency coefficient matrix; and entropy-encoding information about the angle parameters and the second frequency coefficient matrix, wherein the angle parameters indicate a degree of partial switching between the at least one of the rows and the columns of the first frequency coefficient matrix.

The determining the angle parameters may include determining the angle parameters based on an intra prediction direction of the current block.

The determining the angle parameters based on the intra prediction direction of the current block may include selecting a first matrix for performing partial switching between the rows and selecting a second matrix for performing partial switching between the columns from among a plurality of matrices based on the intra prediction direction of the current block.

The generating the second frequency coefficient matrix may include multiplying a left side of the first frequency coefficient matrix by the selected first matrix and multiplying a right side of the first frequency coefficient matrix by the selected second matrix.

The angle parameters may be parameters for Euler angles.

According to an aspect of another exemplary embodiment, there is provided a method of decoding an image, the method including: entropy-decoding information about predetermined angle parameters and a second frequency coefficient matrix; determining the angle parameters based on the entropy-decoded information about the angle parameters and whether a current block is intra predicted; inverse quantizing the entropy-decoded second frequency coefficient matrix; generating a first frequency coefficient matrix by performing a partial switch between at least one of rows and columns of the second frequency coefficient matrix based on the determined angle parameters; and restoring the current block by performing DCT on the first frequency coefficient matrix, wherein the angle parameters indicate a degree of partial switching between the at least one of the rows and the columns of the second frequency coefficient matrix.

According to an aspect of another exemplary embodiment, there is provided an apparatus for encoding an image, the apparatus including: a transformer which generates a first frequency coefficient matrix by performing DCT on a current block and generating a second frequency coefficient matrix by performing a partial switch between at least one of rows and columns of the first frequency coefficient matrix based on determined angle parameters according to whether the current block is intra predicted; a quantizer which quantizes the second frequency coefficient matrix; and an entropy encoder which entropy-encodes information about the angle parameters and the second frequency coefficient matrix, wherein the angle parameters indicate a degree of partial switching between the at least one of the rows and the columns of the first frequency coefficient matrix.

According to an aspect of another exemplary embodiment, there is provided an apparatus for decoding an image, the apparatus including: an entropy decoder which entropy-decodes information about predetermined angle parameters and a second frequency coefficient matrix; an inverse quantizer which inverse quantizes the entropy-decoded second frequency coefficient matrix; and an inverse transformer which generates a first frequency coefficient matrix by performing a partial switch between at least one of rows and columns of the second frequency coefficient matrix based on the determined angle parameters according to the entropy-decoded information about the angle parameters and whether a current block is intra predicted and restoring the current block by performing DCT on the first frequency coefficient matrix, wherein the angle parameters indicate a degree of partial switching between the at least one of the rows and the columns of the second frequency coefficient matrix.

According to an aspect of another exemplary embodiment, there is provided a computer readable recording medium having embodied thereon a computer program for executing at least one of the method of encoding an image and the method of decoding an image.

BRIEF DESCRIPTION OF THE DRAWINGS

The above and other features will become more apparent by describing in detail exemplary embodiments thereof with reference to the attached drawings in which:

FIGS. 12A through 12I illustrate ROT matrices according to an exemplary embodiment;

FIGS. 13A and 13B illustrate inverse ROT syntaxes according to an exemplary embodiment;

FIGS. 20A and 20B illustrate ROT matrices according to another exemplary embodiment; and FIGS. 21A and 21B illustrate inverse ROT syntaxes according to another exemplary embodiment.

DETAILED DESCRIPTION OF EXEMPLARY EMBODIMENTS

Hereinafter, one or more exemplary embodiments will be described more fully with reference to the accompanying drawings. Expressions such as "at least one of," when preceding a list of elements, modify the entire list of elements and do not modify the individual elements of the list. In the present specification, an "image" may denote a still image for a video or a moving image, that is, the video itself.

Figure 1:
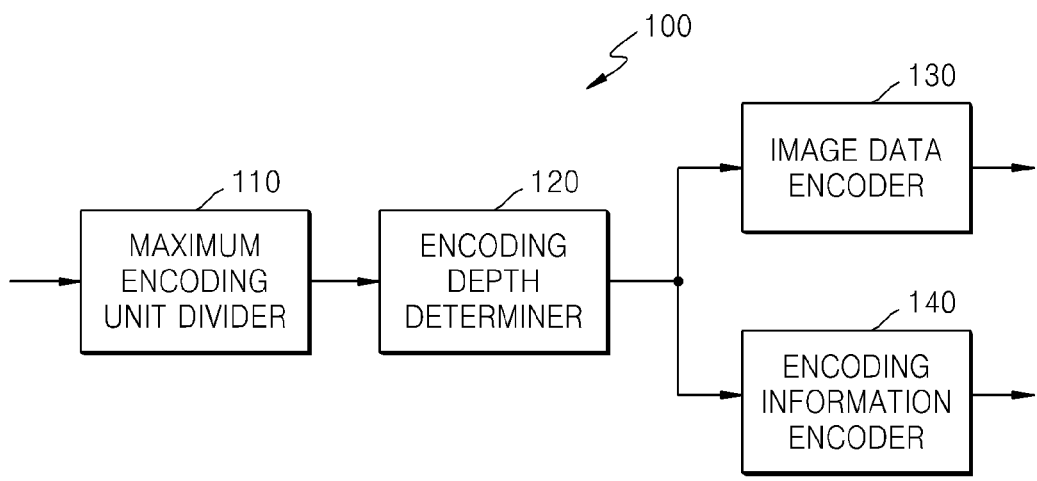
FIG. 1 is a block diagram of an apparatus for encoding an image, according to an exemplary embodiment.

FIG. 1 is a block diagram of an apparatus 100 for encoding an image, according to an exemplary embodiment.

Referring to FIG. 1, the apparatus 100 for encoding an image includes a maximum coding unit divider 110, an encoding depth determiner 120, an image data encoder 130, and an encoding information encoder 140.

The maximum coding unit divider 110 may divide a current frame or slice based on a maximum coding unit that is a coding unit of the largest size. That is, the maximum coding unit divider 110 may divide the current frame or slice into at least one maximum coding unit.

According to an exemplary embodiment, a coding unit may be represented using a maximum coding unit and a depth. As described above, the maximum coding unit indicates a coding unit having the largest size from among coding units of the current frame, and the depth indicates a degree of hierarchically decreasing the coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a kth depth may include a plurality of sub coding units of a (k+n)th depth (k and n are integers equal to or greater than 1).

According to an increase of the size of a frame to be encoded, encoding an image in a greater coding unit may cause a higher image compression ratio. However, if a greater coding unit is fixed, an image may not be efficiently encoded by reflecting continuously changing image characteristics.

For example, when a smooth area such as the sea or sky is encoded, the greater a coding unit is, the more a compression ration may increase. However, when a complex area such as people or buildings is encoded, the smaller a coding unit is, the more a compression ration may increase.

Accordingly, according to an exemplary embodiment, a different maximum image coding unit and a different maximum depth are set for each frame or slice. Since a maximum depth denotes the maximum number of times by which a coding unit may decrease, the size of each minimum coding unit included in a maximum image coding unit may be variably set according to a maximum depth. The maximum depth may be determined differently for each frame or slice or for each maximum coding unit.

The encoding depth determiner 120 determines a division shape of the maximum coding unit. The division shape may be determined based on calculation of rate-distortion (RD) costs. The determined division shape of the maximum coding unit is provided to the encoding information encoder 140, and image data according to maximum coding units is provided to the image data encoder 130.

A maximum coding unit may be divided into sub coding units having different sizes according to different depths, and the sub coding units having different sizes, which are included in the maximum coding unit, may be predicted or frequency-transformed based on processing units having different sizes. In other words, the apparatus 100 for encoding an image may perform a plurality of processing operations for image encoding based on processing units having various sizes and various shapes. To encode image data, processing operations such as at least one of prediction, transform, and entropy encoding are performed, wherein processing units having the same size or different sizes may be used for every operation.

For example, the apparatus 100 for encoding an image may select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of height and width of a coding unit is equally divided by two. Hereinafter, a processing unit, which is the base of prediction, is defined as a 'prediction unit'.

A prediction mode may be at least one of an intra mode, an inter mode, and a skip mode, and a specific prediction mode may be performed for only a prediction unit having a specific size or shape. For example, the intra mode may be performed for only prediction units having the sizes of 2N×2N and N×N of which the shape is a square. Further, the skip mode may be performed for only a prediction unit having the size of 2N×2N. If a plurality of prediction units exist in a coding unit, the prediction mode with the least encoding errors may be selected after performing prediction for every prediction unit.

Alternatively, the apparatus 100 for encoding an image may perform transform on image data based on a processing unit having a different size from a coding unit. For the transform in the coding unit, the transform may be performed based on a processing unit having a size equal to or smaller than that of the coding unit. Hereinafter, a processing unit, which is the base of transform, is defined as a 'transform unit'. The transform may be discrete cosine transform (DCT) or Karhunen Loeve transform (KLT) or any other fixed point spatial transform.

The encoding depth determiner 120 may determine sub coding units included in a maximum coding unit using RD optimization based on a Lagrangian multiplier. In other words, the encoding depth determiner 120 may determine which shape a plurality of sub coding units divided from the maximum coding unit have, wherein the plurality of sub coding units have different sizes according to their depths. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transform unit of the sub coding unit.

The information about the division shape of the maximum coding unit may be information, e.g., flag information, indicating whether each coding unit is divided. For example, when the maximum coding unit is divided and encoded, information indicating whether the maximum coding unit is divided is encoded. Also, when a sub coding unit divided from the maximum coding unit is divided and encoded, information indicating whether the sub coding unit is divided is encoded.

Since sub coding units having different sizes exist for each maximum coding unit and information about an encoding mode must be determined for each sub coding unit, information about at least one encoding mode may be determined for one maximum coding unit.

The apparatus 100 for encoding an image may generate sub coding units by equally dividing both height and width of a maximum coding unit by two according to an increase of depth. That is, when the size of a coding unit of a kth depth is 2N×2N, the size of a coding unit of a (k+1)th depth is N×N.

Accordingly, the apparatus 100 for encoding an image may determine an optimal division shape for each maximum coding unit based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions may be more efficiently encoded.

Figure 2:
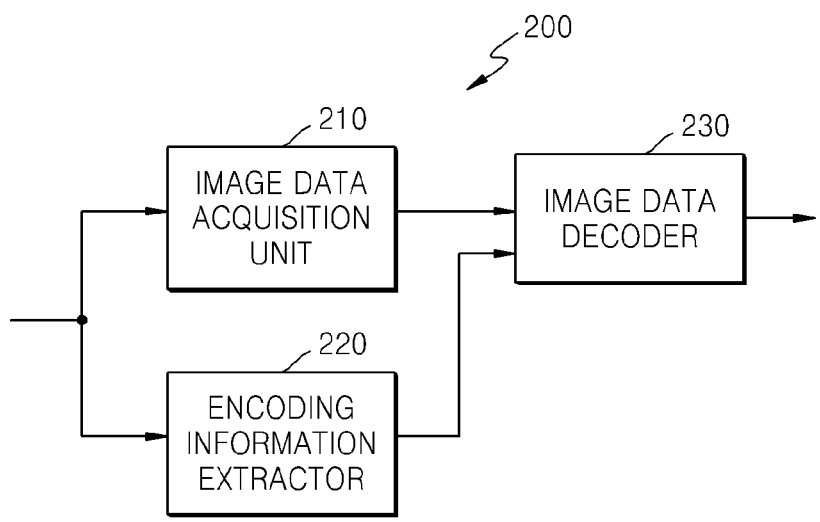
FIG. 2 is a block diagram of an apparatus for decoding an image, according to an exemplary embodiment.

FIG. 2 is a block diagram of an apparatus 200 for decoding an image according to an exemplary embodiment.

Referring to FIG. 2, the apparatus 200 for decoding an image includes an image data acquisition unit 210, an encoding information extractor 220, and an image data decoder 230.

The image data acquisition unit 210 acquires image data according to maximum coding units by parsing a bitstream received by the apparatus 200 for decoding an image and outputs the image data to the image data decoder 230. The image data acquisition unit 210 may extract information about a maximum coding unit of a current frame or slice from a header of the current frame or slice. In other words, the image data acquisition unit 210 divides the bitstream in the maximum coding unit so that the image data decoder 230 may decode the image data according to maximum coding units.

The encoding information extractor 220 extracts information about a maximum coding unit, a maximum depth, a division shape of the maximum coding unit, an encoding mode of sub coding units from the header of the current frame by parsing the bitstream received by the apparatus 200 for decoding an image. The information about a division shape and the information about an encoding mode are provided to the image data decoder 230.

The information about a division shape of the maximum coding unit may include information about sub coding units having different sizes according to depths and included in the maximum coding unit, and may be information (e.g., flag information) indicating whether each coding unit is divided.

The information about an encoding mode may include information about a prediction unit according to sub coding units, information about a prediction mode, and information about a transform unit.

The image data decoder 230 restores the current frame by decoding image data of every maximum coding unit based on the information extracted by the encoding information extractor 220.

The image data decoder 230 may decode sub coding units included in a maximum coding unit based on the information about a division shape of the maximum coding unit. A decoding process may include a prediction process including intra prediction and motion compensation and an inverse transform process.

The image data decoder 230 may perform intra prediction or inter prediction based on information about a prediction unit and information about a prediction mode in order to predict a prediction unit. The image data decoder 230 may also perform inverse transform for each sub coding unit based on information about a transform unit of a sub coding unit.

Figure 3:
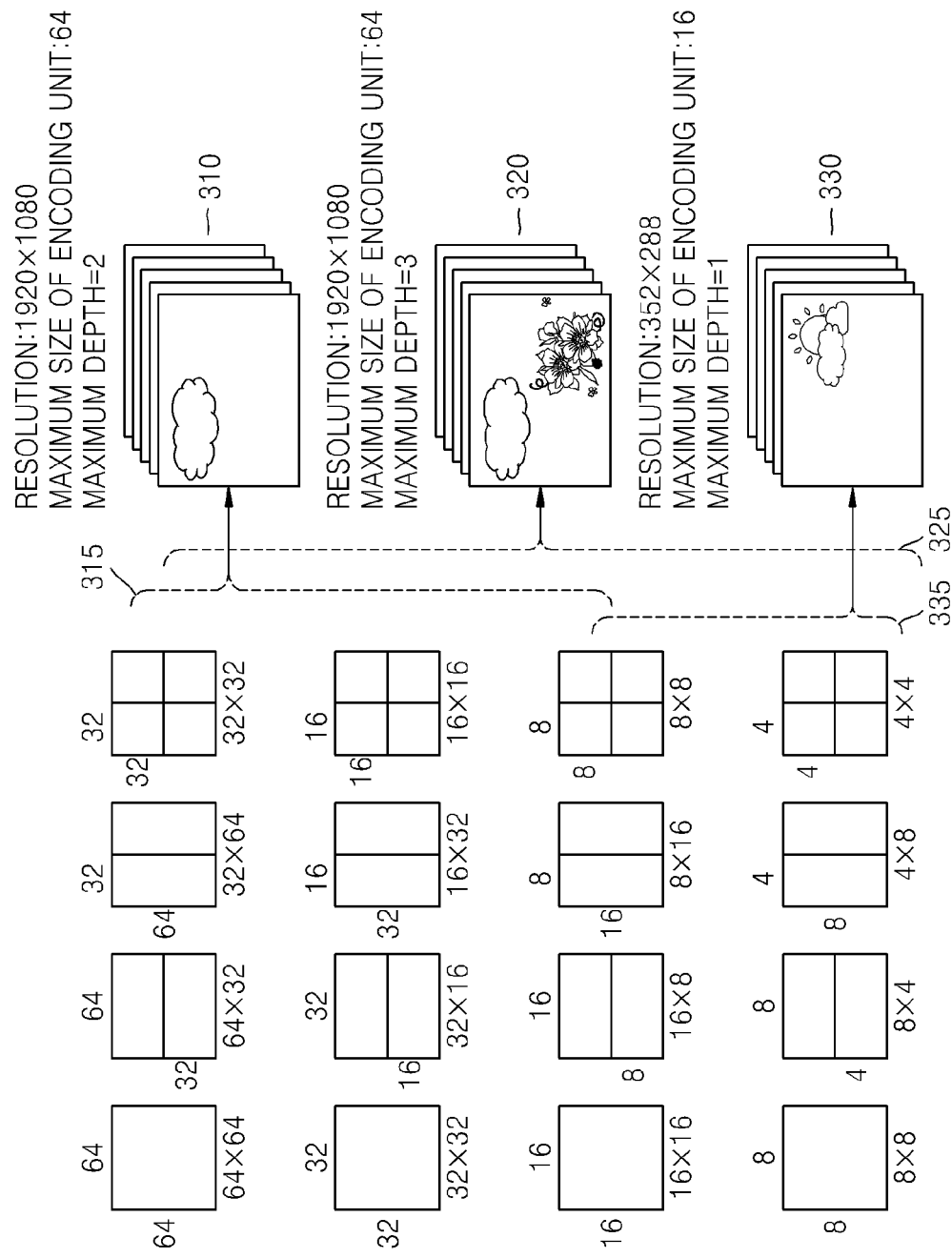
FIG. 3 illustrates hierarchical coding units according to an exemplary embodiment.

FIG. 3 illustrates hierarchical coding units according to an exemplary embodiment.

Referring to FIG. 3, the hierarchical coding units may include coding units whose width×heights are 64×64, 32×32, 16×16, 8×8, and 4×4. Besides these coding units having perfect square shapes, coding units whose width×heights are 64×32, 32×64, 32×16, 16×32, 16×8, 8×16, 8×4, and 4×8 may also exist.

Referring to FIG. 3, for image data 310 whose resolution is 1920×1080, the size of a maximum coding unit is set to 64×64, and a maximum depth is set to 2.

For image data 320 whose resolution is 1920×1080, the size of a maximum coding unit is set to 64×64, and a maximum depth is set to 3. For image data 330 whose resolution is 352×288, the size of a maximum coding unit is set to 16×16, and a maximum depth is set to 2.

When the resolution is high or the amount of data is great, a maximum size of a coding unit may be relatively great to increase a compression ratio and exactly reflect image characteristics. Accordingly, for the image data 310 and 320 having higher resolution than the image data 330, 64×64 may be selected as the size of a maximum coding unit.

A maximum depth indicates the total number of layers in the hierarchical coding units. Since the maximum depth of the image data 310 is 2, a coding unit 315 of the image data 310 may include a maximum coding unit whose longer axis size is 64 and sub coding units whose longer axis sizes are 32 and 16, according to an increase of a depth.

On the other hand, since the maximum depth of the image data 330 is 1, a coding unit 335 of the image data 330 may include a maximum coding unit whose longer axis size is 16 and coding units whose longer axis sizes are 8 and 4, according to an increase of a depth.

However, since the maximum depth of the image data 320 is 3, a coding unit 325 of the image data 320 may include a maximum coding unit whose longer axis size is 64 and sub coding units whose longer axis sizes are 32, 16, 8 and 4 according to an increase of a depth. Since an image is encoded based on a smaller sub coding unit as a depth increases, an exemplary embodiment is suitable for encoding an image including more minute scenes.

Figure 4:
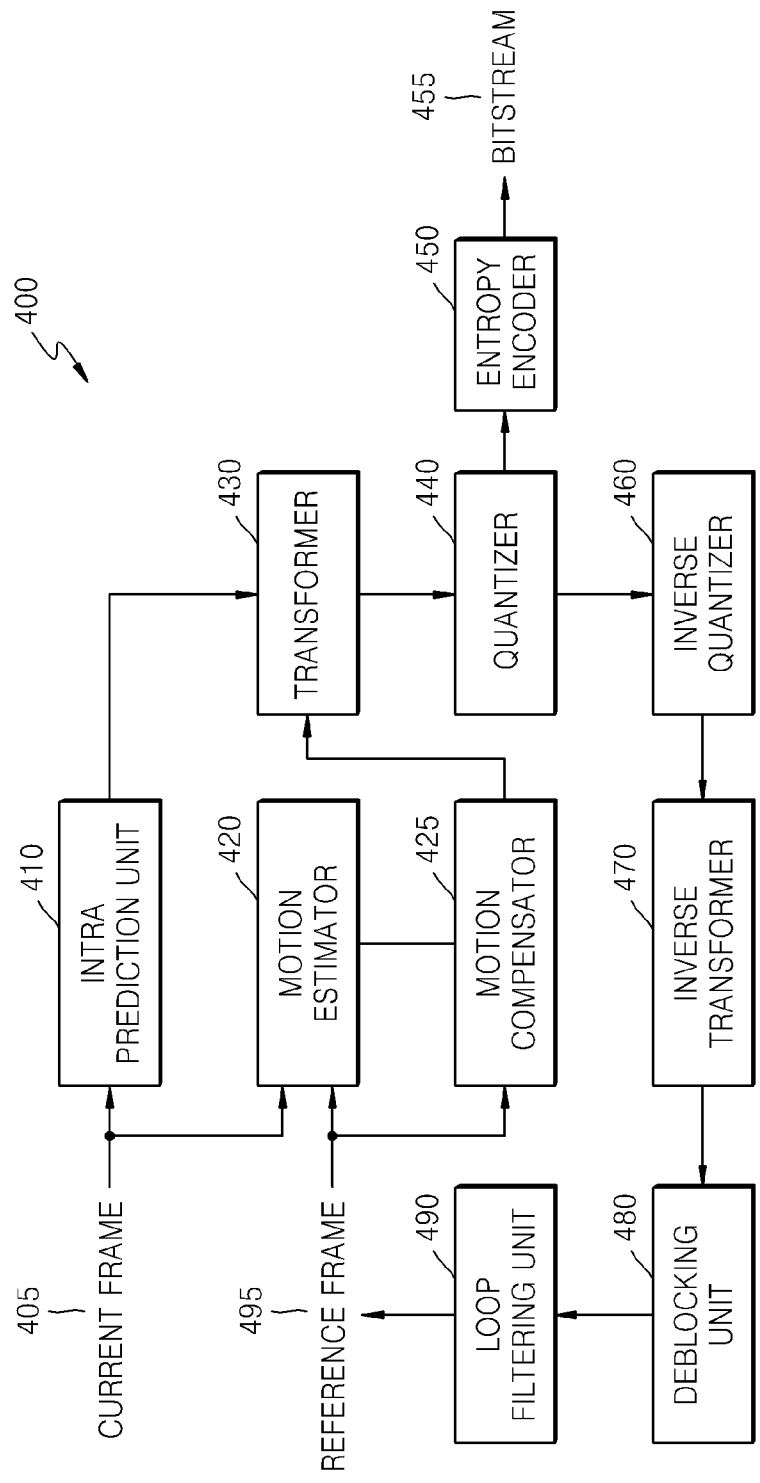
FIG. 4 is a block diagram of an image encoder based on a coding unit, according to an exemplary embodiment.

FIG. 4 is a block diagram of an image encoder 400 based on a coding unit, according to an exemplary embodiment.

An intra prediction unit 410 performs intra prediction on prediction units of the intra mode in a current frame 405, and a motion estimator 420 and a motion compensator 425 perform inter prediction and motion compensation on prediction units of the inter mode using the current frame 405 and a reference frame 495.

Residual values are generated based on the prediction units output from the intra prediction unit 410, the motion estimator 420, and the motion compensator 425, and the generated residual values are output as quantized transform coefficients by passing through a transformer 430 and a quantizer 440.

The quantized transform coefficients are restored to residual values by passing through an inverse quantizer 460 and a inverse transformer 470, and the restored residual values are post-processed by passing through a deblocking unit 480 and a loop filtering unit 490 and output as the reference frame 495. The quantized transform coefficients may be output as a bitstream 455 by passing through an entropy encoder 450.

To perform encoding based on an encoding method according to an exemplary embodiment, components of the image encoder 400, i.e., the intra prediction unit 410, the motion estimator 420, the motion compensator 425, the transformer 430, the quantizer 440, the entropy encoder 450, the inverse quantizer 460, the inverse transformer 470, the deblocking unit 480 and the loop filtering unit 490, perform image encoding processes based on a maximum coding unit, a sub coding unit according to depths, a prediction unit, and a transform unit.

Figure 5:
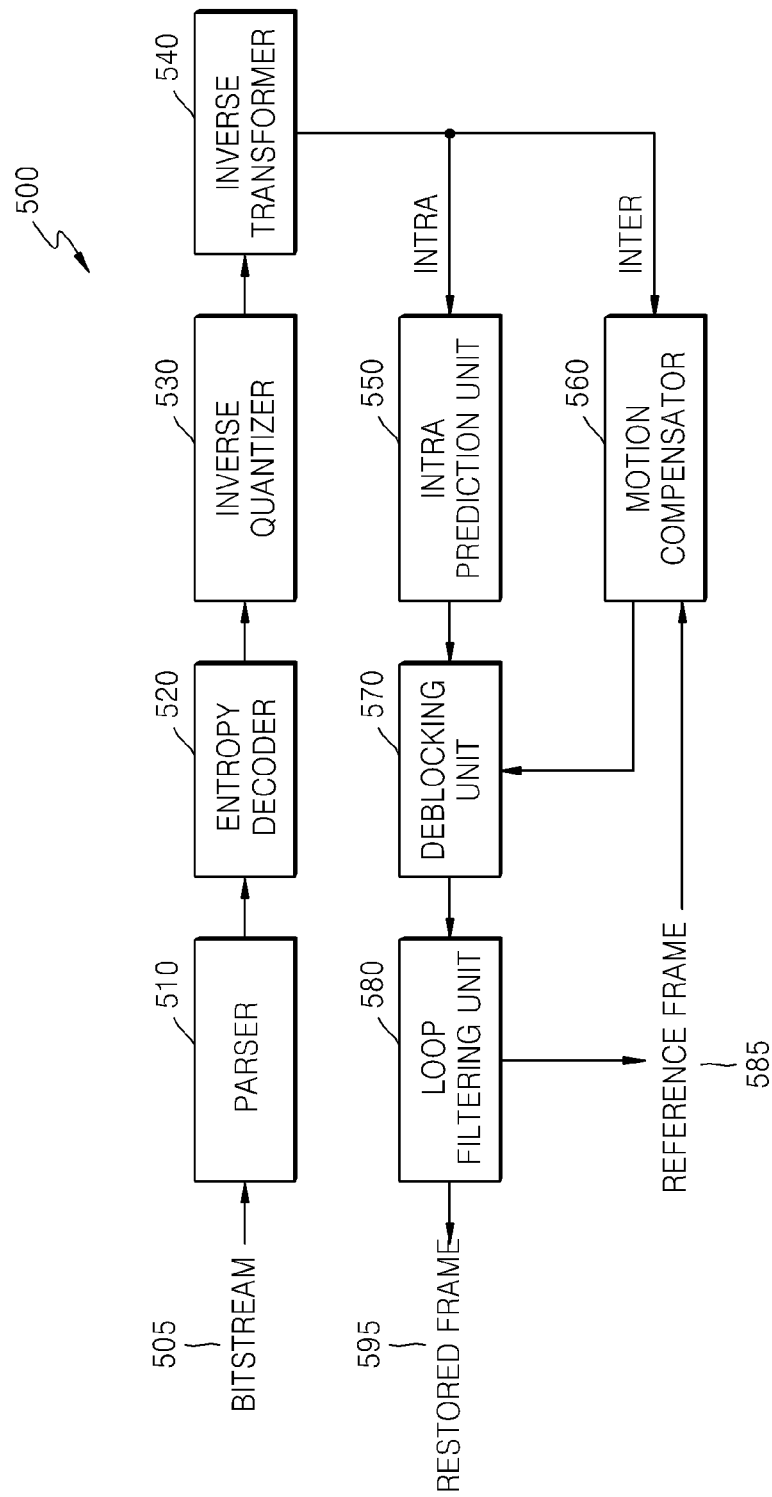
FIG. 5 is a block diagram of an image decoder based on a coding unit, according to an exemplary embodiment.

FIG. 5 is a block diagram of an image decoder 500 based on a coding unit, according to an exemplary embodiment.

Referring to FIG. 5, a bitstream 505 passes through a parser 510 so that encoded image data to be decoded and encoding information necessary for decoding are parsed. The encoded image data is output as inverse-quantized data by passing through an entropy decoder 520 and an inverse quantizer 530 and restored to residual values by passing through an inverse transformer 540. The residual values are restored according to coding units by being added to an intra prediction result of an intra prediction unit 550 or a motion compensation result of a motion compensator 560. The restored coding units are used for prediction of next coding units or a next frame by passing through a deblocking unit 570 and a loop filtering unit 580.

To perform decoding based on a decoding method according to an exemplary embodiment, components of the image decoder 500, i.e., the parser 510, the entropy decoder 520, the inverse quantizer 530, the inverse transformer 540, the intra prediction unit 550, the motion compensator 560, the deblocking unit 570 and the loop filtering unit 580, perform image decoding processes based on a maximum coding unit, a sub coding unit according to depths, a prediction unit, and a transform unit.

In particular, the intra prediction unit 550 and the motion compensator 560 determine a prediction unit and a prediction mode in a sub coding unit by considering a maximum coding unit and a depth, and the inverse transformer 540 performs inverse transform by considering the size of a transform unit.

Figure 6:
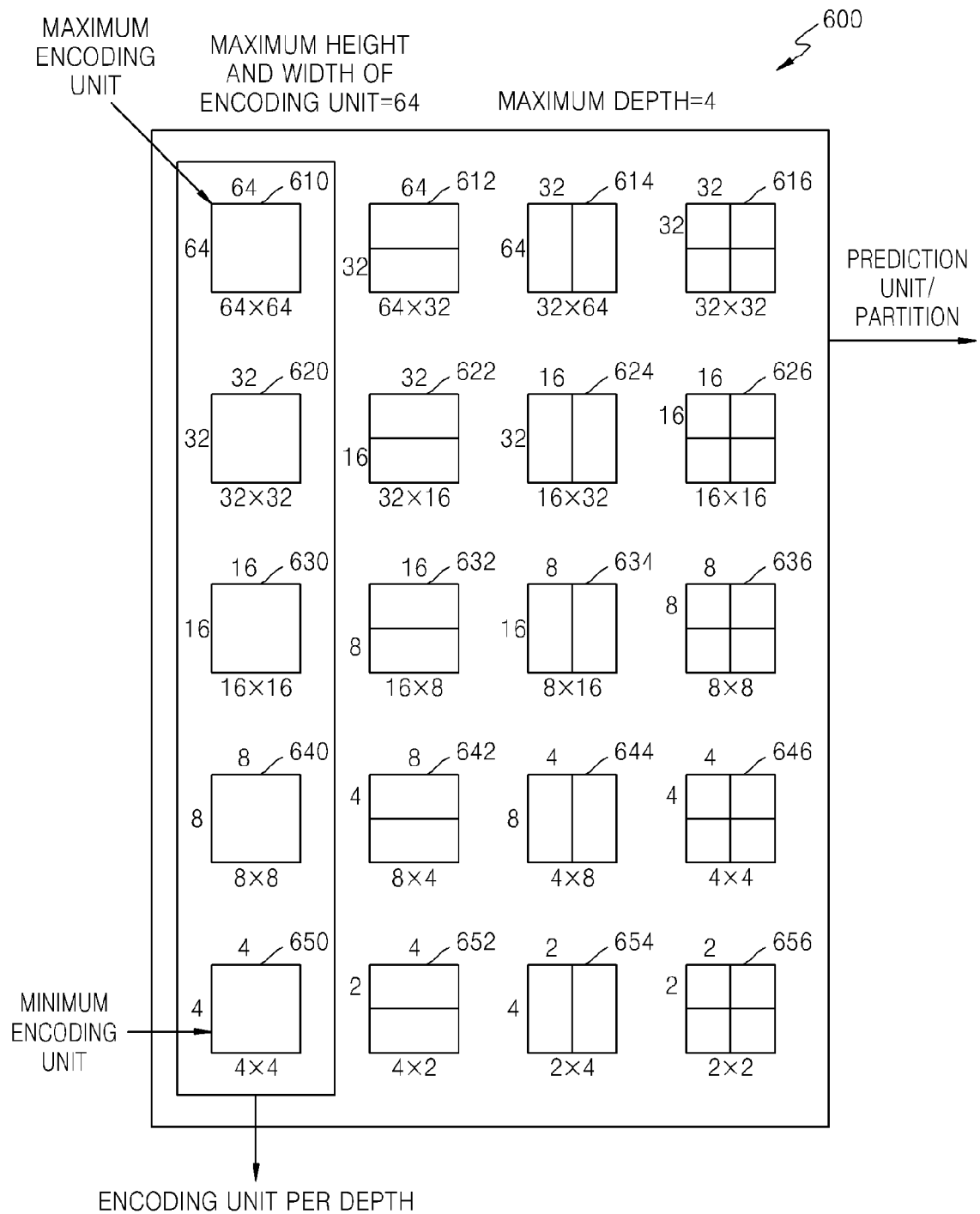
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment.

The apparatus 100 for encoding an image illustrated in FIG. 1 and the apparatus 200 for decoding an image illustrated in FIG. 2 use hierarchical coding units to perform encoding and decoding in consideration of image characteristics. A maximum coding unit and a maximum depth may be adaptively set according to the image characteristics or variously set according to requirements of a user.

In FIG. 6, a hierarchical coding unit structure 600 has a maximum coding unit 610 whose height and width are 64 and maximum depth is 4. A depth increases along a vertical axis of the hierarchical coding unit structure 600, and as a depth increases, heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and the size of a coding unit, i.e., height and width, of 64×64. A depth increases along the vertical axis, and there exist a sub coding unit 620 whose size is 32×32 and depth is 1, a sub coding unit 630 whose size is 16×16 and depth is 2, a sub coding unit 640 whose size is 8×8 and depth is 3, and a sub coding unit 650 whose size is 4×4 and depth is 4. The sub coding unit 650 whose size is 4×4 and depth is 4 is a minimum coding unit, and the minimum coding unit may be divided into prediction units, each of which is less than the minimum coding unit.

Referring to FIG. 6, examples of a prediction unit are shown along the horizontal axis according to each depth. That is, a prediction unit of the maximum coding unit 610 whose depth is 0 may be a prediction unit whose size is equal to the coding unit 610, i.e., 64×64, or a prediction unit 612 whose size is 64×32, a prediction unit 614 whose size is 32×64, or a prediction unit 616 whose size is 32×32, which has a size smaller than the coding unit 610 whose size is 64×64.

A prediction unit of the coding unit 620 whose depth is 1 and size is 32×32 may be a prediction unit whose size is equal to the coding unit 620, i.e., 32×32, or a prediction unit 622 whose size is 32×16, a prediction unit 624 whose size is 16×32, or a prediction unit 626 whose size is 16×16, which has a size smaller than the coding unit 620 whose size is 32×32.

A prediction unit of the coding unit 630 whose depth is 2 and size is 16×16 may be a prediction unit whose size is equal to the coding unit 630, i.e., 16×16, or a prediction unit 632 whose size is 16×8, a prediction unit 634 whose size is 8×16, or a prediction unit 636 whose size is 8×8, which has a size smaller than the coding unit 630 whose size is 16×16.

A prediction unit of the coding unit 640 whose depth is 3 and size is 8×8 may be a prediction unit whose size is equal to the coding unit 640, i.e., 8×8, or a prediction unit 642 whose size is 8×4, a prediction unit 644 whose size is 4×8, or a prediction unit 646 whose size is 4×4, which has a size smaller than the coding unit 640 whose size is 8×8.

Finally, the coding unit 650 whose depth is 4 and size is 4×4 is a minimum coding unit and a coding unit of a maximum depth, and a prediction unit of the coding unit 650 may be a prediction unit 650 whose size is 4×4, a prediction unit 652 having a size of 4×2, a prediction unit 654 having a size of 2×4, or a prediction unit 656 having a size of 2×2.

Figure 7:
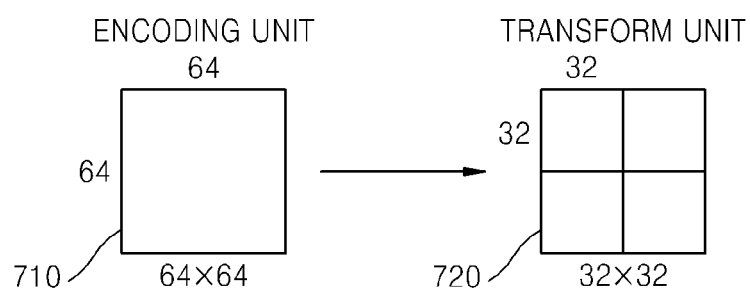
FIG. 7 illustrates a coding unit and a transform unit, according to an exemplary embodiment.

FIG. 7 illustrates a coding unit and a transform unit, according to an exemplary embodiment.

The apparatus 100 for encoding an image illustrated in FIG. 1 and the apparatus 200 for decoding an image illustrated in FIG. 2 perform encoding and decoding with a maximum coding unit itself or with sub coding units, which are equal to or smaller than the maximum coding unit, divided from the maximum coding unit. In the encoding and decoding process, the size of a transform unit for transform is selected to be no larger than that of a corresponding coding unit. For example, referring to FIG. 7, when a current coding unit 710 has the size of 64×64, transform may be performed using a transform unit 720 having the size of 32×32.

FIGS. 8A through 8D illustrate division shapes of a coding unit, a prediction unit, and a transform unit, according to an exemplary embodiment.

Figure 8A:
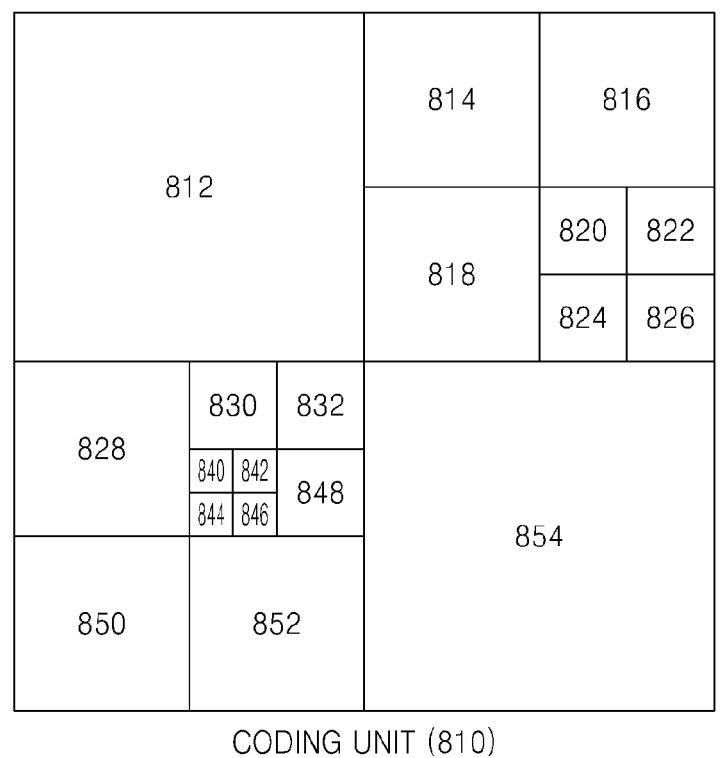
FIGS. 8A through 8D illustrate division shapes of a coding unit, a prediction unit, and a transform unit, according to an exemplary embodiment.
Figure 8B:
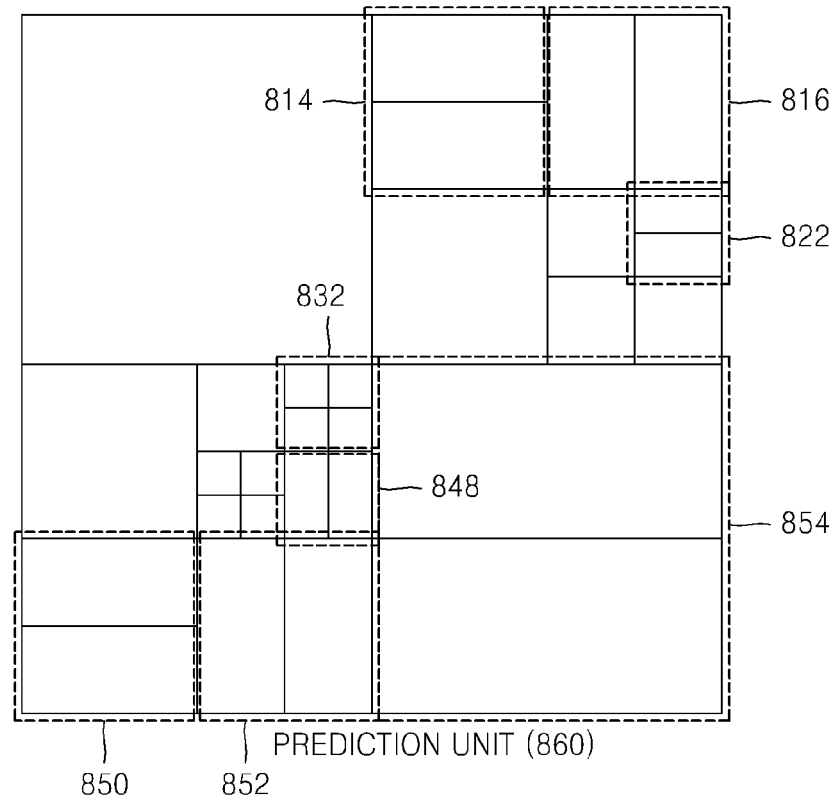

FIGS. 8A and 8B illustrate a coding unit and a prediction unit, according to an exemplary embodiment.

FIG. 8A shows a division shape selected by the apparatus 100 for encoding an image illustrated in FIG. 1, in order to encode a maximum coding unit 810. The apparatus 100 for encoding an image divides the maximum coding unit 810 into various shapes, performs encoding, and selects an optimal division shape by comparing encoding results of various division shapes with each other based on R-D costs. When it is optimal that the maximum coding unit 810 is encoded as it is, the maximum coding unit 810 may be encoded without dividing the maximum coding unit 810 as illustrated in FIGS. 8A through 8D.

Referring to FIG. 8B, the maximum coding unit 810 whose depth is 0 is encoded by dividing it into sub coding units whose depths are equal to or greater than 1. That is, the maximum coding unit 810 is divided into 4 sub coding units whose depths are 1, and all or some of the sub coding units whose depths are 1 are divided into sub coding units whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

FIG. 8B shows a division shape of a prediction unit for the maximum coding unit 810.

Referring to FIG. 8B, a prediction unit 860 for the maximum coding unit 810 may be divided differently from the maximum coding unit 810. In other words, a prediction unit for each of sub coding units may be smaller than a corresponding sub coding unit.

For example, a prediction unit for a sub coding unit 854 located in a lower-right side among the sub coding units whose depths are 1 may be smaller than the sub coding unit 854. In addition, prediction units for some sub coding units 814, 816, 850, and 852 from among sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

Figure 8C:
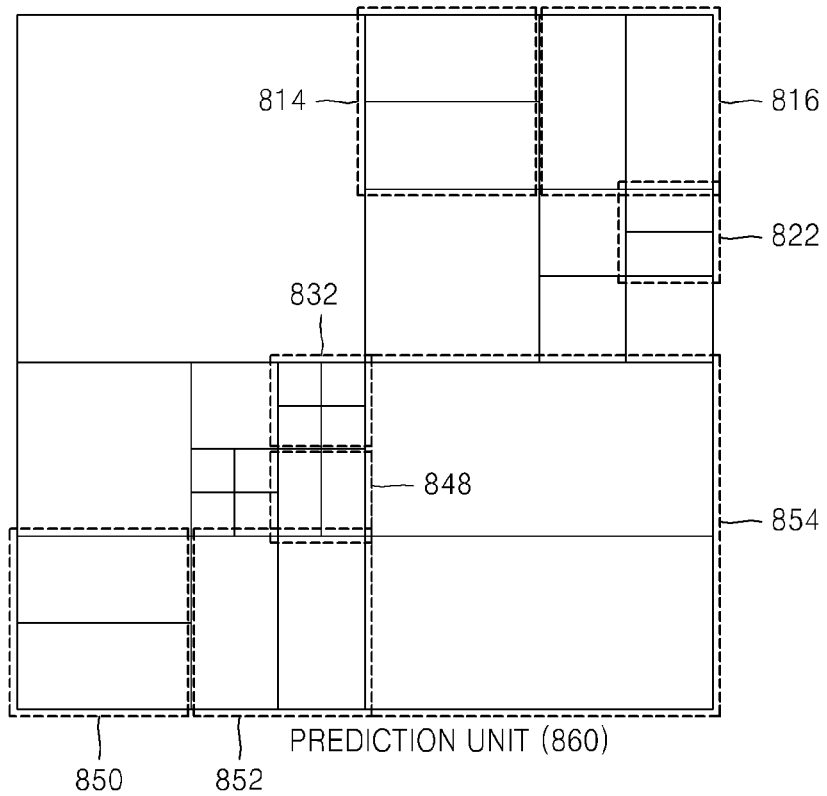
Figure 8D:
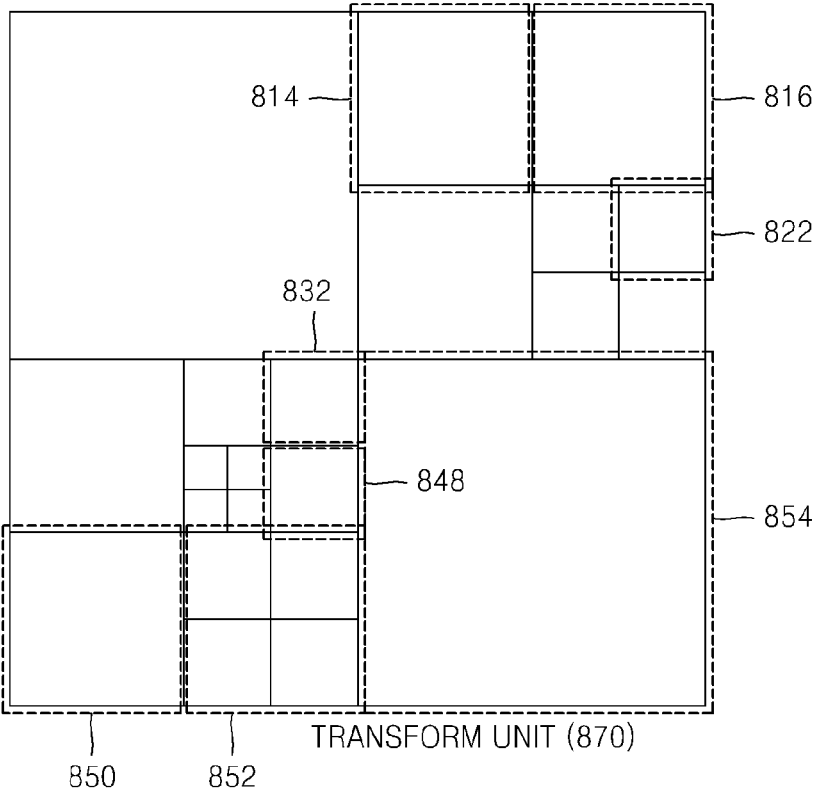

FIGS. 8C and 8D illustrate a prediction unit and a transform unit, according to an exemplary embodiment.

FIG. 8C shows a division shape of a prediction unit for the maximum coding unit 810 shown in FIG. 8B, and FIG. 8D shows a division shape of a transform unit of the maximum coding unit 810.

Referring to FIG. 8D, a division shape of a transform unit 870 may be set differently from the prediction unit 860.

For example, even though a prediction unit for the coding unit 854 whose depth is 1 is selected with a shape whereby the height of the coding unit 854 is equally divided by two, a transform unit may be selected with the same size as the coding unit 854. Likewise, even though prediction units for coding units 814 and 850 whose depths are 2 are selected with a shape whereby the height of each of the coding units 814 and 850 is equally divided by two, a transform unit may be selected with the same size as the original size of each of the coding units 814 and 850.

A transform unit may be selected with a smaller size than a prediction unit. For example, when a prediction unit for the coding unit 852 whose depth is 2 is selected with a shape whereby the width of the coding unit 852 is equally divided by two, a transform unit may be selected with a shape whereby the coding unit 852 is equally divided by four in directions of height and width, which has a smaller size than the shape of the prediction unit.

Figure 9:
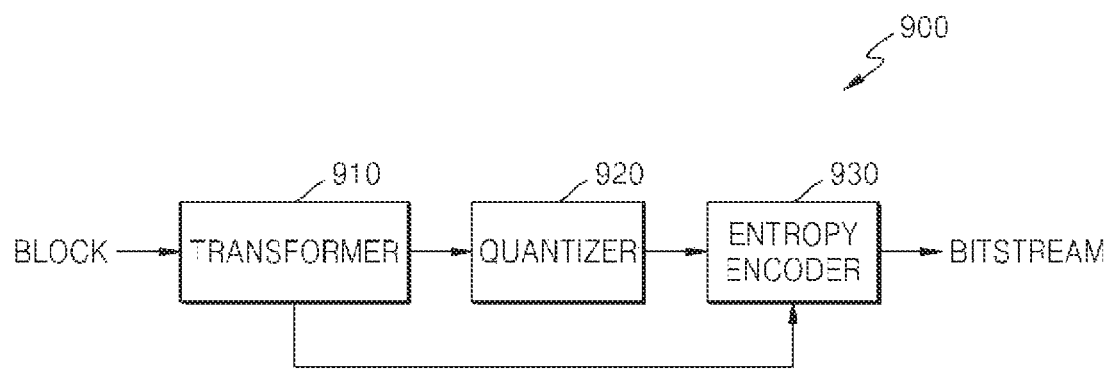
FIG. 9 is a block diagram of an apparatus for encoding an image, according to another exemplary embodiment.

FIG. 9 is a block diagram of an apparatus 900 for encoding an image, according to another exemplary embodiment.

The apparatus 900 for encoding an image illustrated in FIG. 9 may be a module, which is included in the apparatus 100 for encoding an image illustrated in FIG. 1 or the image encoder 400 illustrated in FIG. 4, for performing the following image encoding processes. Referring to FIG. 9, the apparatus 900 for encoding an image includes a transformer 910, a quantizer 920, and an entropy encoder 930.

The transformer 910 receives and transforms a current block to a frequency domain. The transform to the frequency domain may be DCT or KLT or any other fixed point spatial transform, and the received current block may be a residual block. Also, the current block may be a transform unit as described above in relation to FIG. 7 or 8D. As a result of transform, the current block of a pixel domain is transformed into coefficients of the frequency domain. A transform coefficient matrix is generated by performing DCT or KLT or any other fixed point spatial transform on the current block of the pixel domain.

In addition, the transformer 910 performs post-processing to partially switch at least one of rows and columns of the DCT coefficient matrix. The operation of the transformer 910 will now be described in detail with reference to FIG. 10.

Figure 10:
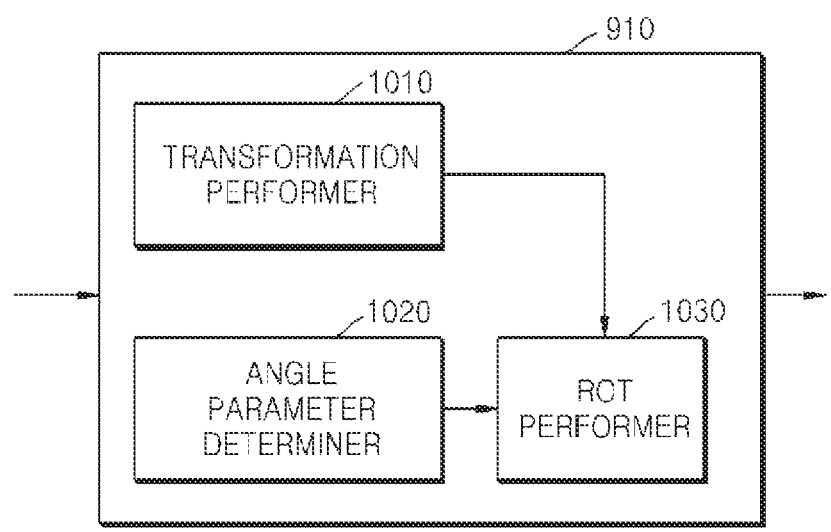
FIG. 10 is a block diagram of a transformer illustrated in FIG. 9, according to an exemplary embodiment.

FIG. 10 is a block diagram of the transformer 910 illustrated in FIG. 9, according to an exemplary embodiment.

Referring to FIG. 10, the transformer 910 includes a transform performer 1010, an angle parameter determiner 1020, and a rotational transform (ROT) performer 1030.

The transform performer 1010 generates a first frequency coefficient matrix of a frequency domain by transforming a current block of a pixel domain. As described above, DCT or KLT or any other fixed point spatial transform may be performed so as to generate the first frequency coefficient matrix including DCT coefficients or KLT or any other fixed point spatial transform coefficients.

The angle parameter determiner 1020 determines an angle parameter indicating a degree of ROT, that is, a partial switching between at least one of rows and columns. Determining of the angle parameter corresponds to selecting one of a plurality of ROT matrices. The first frequency coefficient matrix is rotational transformed based on the plurality of ROT matrices that each correspond to a 'ROT_index', which will be described later, and the ROT matrix that corresponds to an optimal angle parameter may be selected based on an encoding result. The angle parameters may be determined based on calculation of rate-distortion (RD) costs. In other words, the result obtained by repeatedly performing the encoding for a plurality of times based on the ROT is compared based on RD costs, thereby selecting one ROT matrix, as will be described later with reference to FIGS. 21A and 21B.

In addition, when the angle parameter determiner 1020 determines the ROT matrix, the ROT matrix that corresponds to a 'ROT_index' in a different range may be selected based on whether a current block is an intra predicted block and an intra prediction direction, as will be described later with reference to FIGS. 12A through 12I.

The ROT performer 1030 generates a second frequency coefficient matrix by receiving the first frequency coefficient matrix generated from the transform performer 1010 and performing ROT according to the present exemplary embodiment. The ROT is performed based on the ROT matrix determined from the angle parameter determiner 1020 and thus at least one of the rows and columns of the first frequency coefficient matrix is partially switched, thereby generating the second frequency coefficient matrix. The ROT will be described more fully with reference to FIGS. 11A through 11C.

Figure 11A:
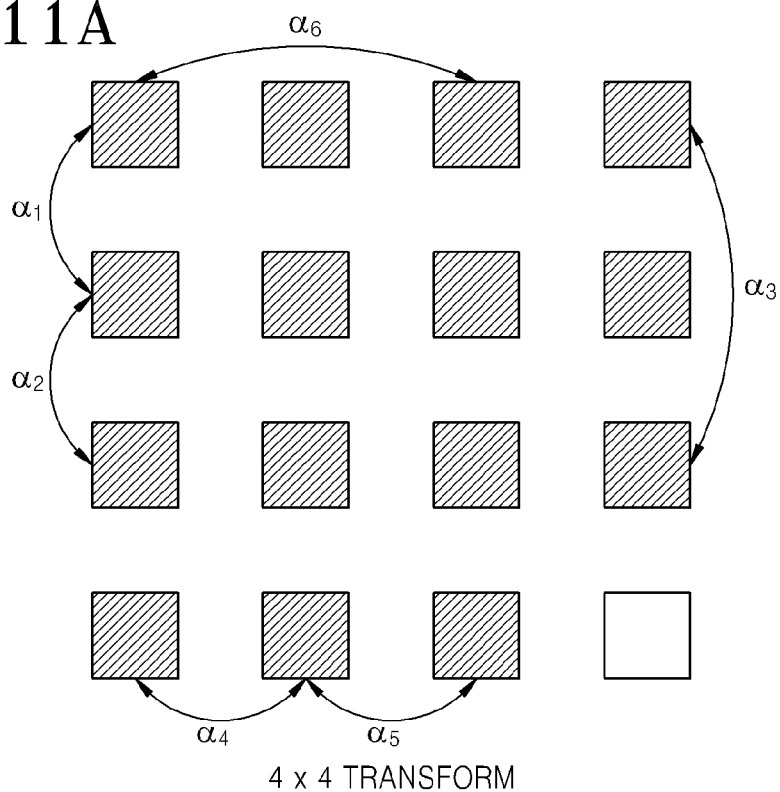
FIGS. 11A through 11C are diagrams for describing rotational transform (ROT) according to an exemplary embodiment.
Figure 11B:
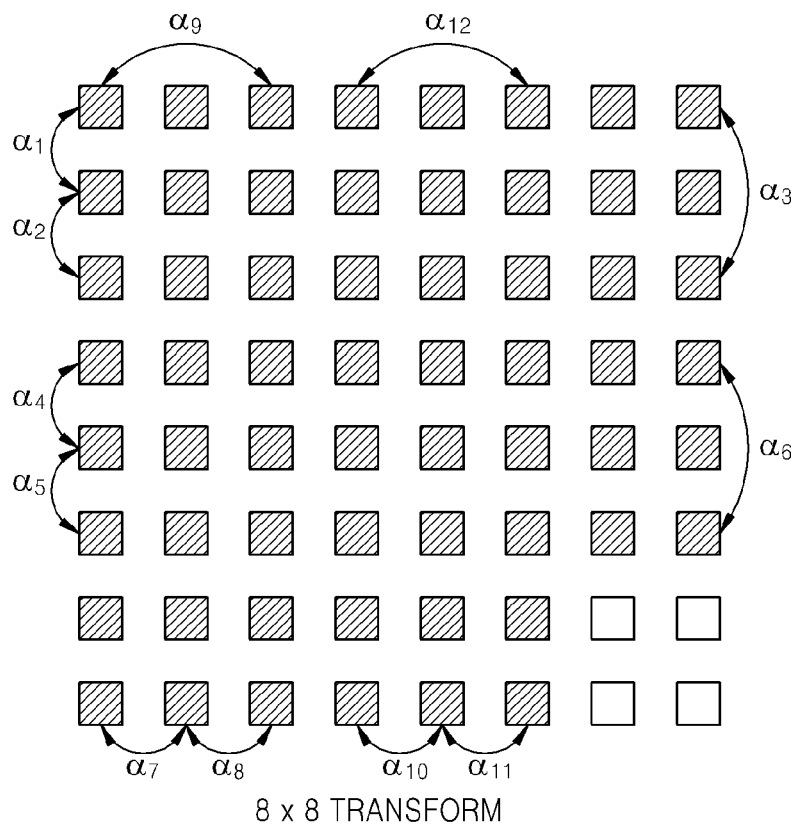
Figure 11C:
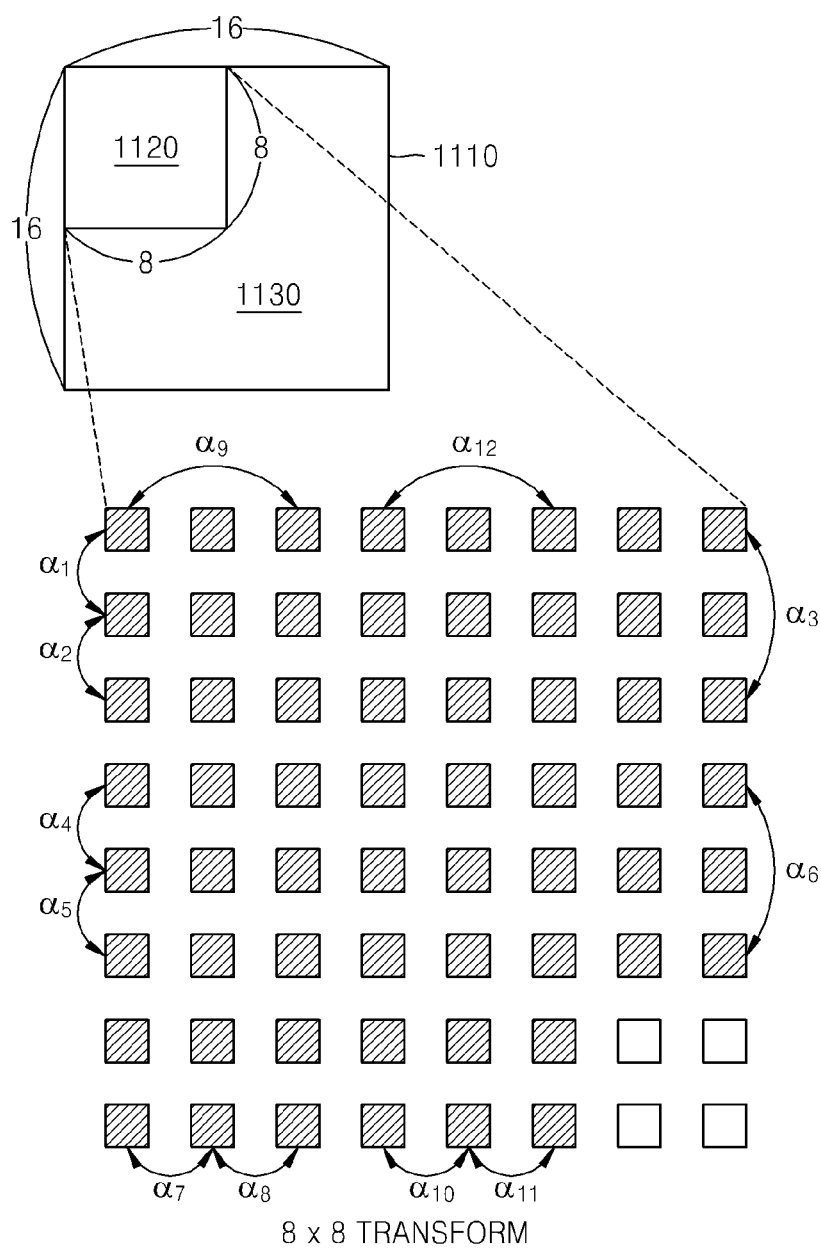

FIGS. 11A through 11C are diagrams for describing ROT according to an exemplary embodiment.

In FIGS. 11A through 11C, the switching of rows and columns of the first frequency coefficient matrix is described. The ROT performer 1030 partially switches at least one of rows and columns of the first frequency coefficient matrix.

In the present exemplary embodiment, partial switching of rows or columns involves partially switching values of two rows or columns by using a certain function such as a sinusoidal function instead of unconditionally switching values of two rows or columns in one to one correspondence.

For example, switching of two rows A and B may be defined according to the value of a parameter 'a' as represented in Equation 1.

Row $A$(new)=cos($a$)*row $A$(old)−sin($a$)*row $B$(old)

Row $B$(new)=sin($a$)*row $A$(old)+cos($a$)*row $B$(old)    Equation 1

Referring to Equation 1, the parameter 'a' operates as an angle. 'a' of Equation 1 is only an example of the angle parameter and in the present exemplary embodiment, a parameter indicating a degree of partial switching between rows and columns of a DCT matrix is defined as an angle parameter.

If the value of the parameter 'a' is 0°, switching is not performed. Also, if the value of the parameter 'a' is 90°, rows are completely switched.

Also, if the value of the parameter 'a' is greater than 90° and is less than 180°, rows are switched and signs of element values are changed. If the value of the parameter 'a' is 180°, rows are not switched but signs of elements included in the rows are changed. In the present exemplary embodiment, partial switching between columns is performed in the same manner as the partial switching between rows.

FIG. 11A illustrates a case in which a ROT is performed on a 4×4 frequency coefficient matrix according to an exemplary embodiment. Referring to FIG. 11A, three angle parameters $\alpha_1, \alpha_2, \alpha_3$ are used in a partial switch between rows of a frequency coefficient matrix, and three angle parameters $\alpha_4, \alpha_5, \alpha_6$ are used in a partial switch between columns.

FIG. 11B illustrates a case in which a ROT is performed on an 8×8 frequency coefficient matrix according to an exemplary embodiment. In the case of FIG. 11B, $\alpha_1, \alpha_2, \alpha_3, \alpha_4, \alpha_5, \alpha_6$ are used in a partial switch between rows, and $\alpha_7, \alpha_8, \alpha_9, \alpha_{10}, \alpha_{11}, \alpha_{12}$ are used in a partial switch between columns.

FIG. 11C illustrates a case in which a ROT is performed on a frequency coefficient matrix having a size equal to or greater than 16×16 according to an exemplary embodiment.

As described above in relation to FIGS. 11A and 11B, as a size of a frequency coefficient matrix is increased, the number of angle parameters is increased. In order to perform the ROT on the 4×4 frequency coefficient matrix of FIG. 11A, six angle parameters are necessary, and in order to perform the ROT on the 8×8 frequency coefficient matrix of FIG. 11B, twelve angle parameters are necessary.

Although a compression rate is improved in a manner that a second frequency coefficient matrix is generated by performing the ROT on the first frequency coefficient matrix, and if the number of angle parameters is increased so that an overhead is increased, a total amount of data is not decreased. Thus, a predetermined size, e.g., when the ROT is performed on the first frequency coefficient matrix having a size equal to or greater than 16×16, coefficient sampling is used.

In other words, as illustrated in FIG. 11C, the ROT performer 1030 selects a sampled frequency coefficient matrix 1120 including only some of coefficients of a first frequency coefficient matrix 1110 and then performs the ROT on the selected frequency coefficient matrix 1120. The ROT is not performed on a remaining portion 1130 of the first frequency coefficient matrix 1110.

In order to achieve a sufficient effect of the ROT on a frequency coefficient matrix having a large size, it is necessary that the coefficients included in the frequency coefficient matrix 1120 have an effect on compression of image data. Thus, the ROT performer 1030 only selects coefficients that have a low frequency component and that may have a value other than 0, and performs the ROT on the coefficients.

In general, a frequency coefficient such as DCT includes coefficients with respect to a low frequency component at an upper left corner of the frequency coefficient matrix. Thus, as illustrated in FIG. 11C, the ROT performer 1030 selects only coefficients positioned at an upper left corner of the first frequency coefficient matrix 1110, and then performs the ROT. In FIG. 11C, the ROT performer 1030 performs the ROT on the frequency coefficient matrix 1120 having a size of 8×8 in the same manner as the ROT in relation to FIG. 11B.

As described in relation to FIGS. 11A through 11C, partial switching between at least one of the rows and columns of the first frequency coefficient matrix is performed based on an angle parameter. However, it is verified by an experiment that a certain angle parameter has high compression rate according to whether a current block is an intra predicted block and an intra prediction direction. When the current block is predicted according to intra prediction or inter prediction, efficiency of ROT may be increased by applying each different angle parameter. When the current block is predicted according to intra prediction, efficiency of ROT may be increased by applying each different angle parameter according to an intra prediction direction.

Accordingly, the ROT performer 1030 may perform ROT on the first frequency coefficient matrix by multiplying each different ROT matrices as represented by Equation 3 based on whether the current block is an intra predicted block and an intra prediction direction.

Referring to the ROT on the 4×4 frequency coefficient matrix of FIG. 11A, different results are obtained according to an application order of three angle parameters $\alpha_1, \alpha_2, \alpha_3$. That is, the three angle parameters are not independent from each other. A second frequency coefficient matrix that is generated as a result of performing the ROT on a case in which the angle parameter $\alpha_1$ is first applied and then the angle parameter $\alpha_2$ is applied is different from an second frequency coefficient matrix that is generated as a result of performing the ROT on a case in which the angle parameter $\alpha_2$ is first applied and then the angle parameter $\alpha_1$ is applied. This will be described in detail with reference to FIG. 14.

Figure 14:
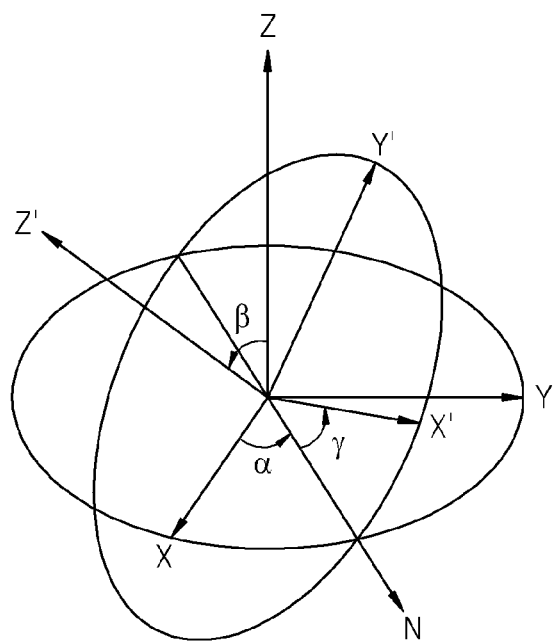
FIG. 14 illustrates Euler angles according to an exemplary embodiment.

FIG. 14 is a diagram of Euler angles according to another exemplary embodiment.

Referring to FIG. 14, it is possible to understand that a switch between rows or between columns of a matrix is similar to rotation of coordinate axes in a three-dimensional (3D) space. That is, three rows or columns correspond to X, Y, and Z axes of 3D coordinates, respectively.

With respect to the rotation of the coordinate axes in the 3D space, different results are obtained according to which axis rotates first. Thus, there have been many attempts to show the rotation of the coordinate axes in the 3D space, and a representative attempt from among the attempts is the Euler angles.

In FIG. 14, $\alpha, \beta, \gamma$ angles indicate the Euler angles. In FIG. 14, X, Y, and Z axes indicate coordinate axes before the rotation, and X', Y', and Z' axes indicate coordinate axes after the rotation. An N-axis is an intersection between an X-Y plane and an X'-Y' plane. Here, the N-axis is referred to as 'line of nodes'.

The angle $\alpha$ indicates an angle between the X-axis and the N-axis which rotate around Z-axis. The angle $\beta$ indicates an angle between the Z-axis and the Z'-axis between which rotate around the N-axis. The angle $\gamma$ indicates an angle between the N-axis and the X'-axis which rotate around the Z'-axis.

The rotation of the coordinate axes according to the Euler angles is given by Equation 2.

$$\begin{pmatrix} \cos\gamma & \sin\gamma & 0 \\ -\sin\gamma & \cos\gamma & 0 \\ 0 & 0 & 1 \end{pmatrix} \begin{pmatrix} 1 & 0 & 0 \\ 0 & \cos\beta & \sin\beta \\ 0 & -\sin\beta & \cos\beta \end{pmatrix} \begin{pmatrix} \cos\alpha & \sin\alpha & 0 \\ -\sin\alpha & \cos\alpha & 0 \\ 0 & 0 & 1 \end{pmatrix} \quad \text{Equation 2}$$

A first matrix indicates rotation around the Z'-axis. A second matrix indicates rotation around the N-axis. A third matrix indicates rotation around the Z-axis.

In the one or more exemplary embodiments, the switch between the rows or between the columns of the matrix may be indicated as rotation of coordinates axes using the Euler angles.

Referring back to FIGS. 9 and 10, the second frequency coefficient matrix generated when the ROT performer 1030 of the transformer 910 performs ROT on the first frequency coefficient matrix is input to the quantizer 920.

The quantizer 920 quantizes coefficients included in the second frequency coefficient matrix according to a predetermined quantization step and the entropy encoder 930 entropy-encodes the quantized second frequency coefficient matrix. Entropy encoding is performed according to a context-adaptive binary arithmetic coding (CABAC) method or a context-adaptive variable length coding (CAVLC) method. If the first frequency coefficient matrix has a large size and thus ROT is performed on the matrix 1120 including only some sampled coefficients, the entire first frequency coefficient matrix 1110 including the selected matrix 1120 on which ROT is performed and the remaining portion 1130 on which ROT is not performed may be quantized and entropy-encoded.

Also, the entropy encoder 930 entropy-encodes information about the angle parameter used in ROT in the transformer 910. The information about the angle parameter may be 'ROT_index' of FIGS. 12A through 12I or 'idx' of FIGS. 20A and 21B.

As will be described later with reference to FIGS. 12A through 12I, ROT is performed on a current block by using a ROT matrix that corresponds to a 'ROT_index' in each different range according to whether the current block is predicted according to intra prediction and an intra prediction direction. Accordingly, when the information about the angle parameter, that is, 'ROT_index' is entropy-encoded, the 'ROT_index' in the entire range may not be encoded.

In FIGS. 12A through 12I, the 'ROT_index' in a first range (for example, range of 0 to 8) may only be entropy-encoded. In the decoding, the entropy-encoded 'ROT_index' is decoded and the current block is intra predicted in a first direction, a predetermine value (for example, 9) is added to the decoded 'ROT_index' and inverse ROT may be performed on the current block by using the ROT matrix that corresponds to the 'ROT_index' in a second range (for example, range of 9 to 17). Similarly, when the current block is intra predicted in a second direction, a predetermined value (for example, 18) is added to the decoded 'ROT_index' and inverse ROT may be performed on the current block by using the ROT matrix that corresponds to the 'ROT_index' in a third range (for example, range of 18 to 26).

The apparatus 900 for encoding an image may efficiently determine angle parameter candidates used to perform ROT as described below.

In order to efficiently perform compression, it is necessary for the apparatus 900 for encoding an image to search for the optimal angle parameters. However, this is a multi-parameter problem having strongly non-smooth dependence on parameter. In order to solve this problem, a Monte Carlo method is used. Here, a Lehmer's random sequence number may be used to generate a random point in the Monte Carlo method. Instead of storing or transmitting an angle parameter used as a parameter, only one integer indicating a sequence number may be stored or transmitted. Here, the sequence number may be the 'idx' or 'ROT_index'. Thus, it is possible to decrease an overhead that is used to inform a decoder of an angle parameter used in the ROT.

That is, matters to be considered to determine a combination of the optimal angle parameters are stated as below:

1. Reversible transform of a spatial transform coefficients matrix
2. Rearrangement of energy for more efficient coding
3. Minimization of information added by using the Lehmer's random sequence number Referring back to FIGS. 11A through 11C, parts that are revised by rotation of the first frequency coefficient matrix are colored black, and parts that are not revised are colored white. In the 4×4 frequency coefficient matrix of FIG. 11A, six angle parameters are involved in revision of fifteen coefficients according to a switch between rows and between columns. In the 8×8 frequency coefficient matrix of FIG. 11B, twelve angle parameters involve in revision of sixty coefficients.

Referring to FIG. 11A, according to an exemplary embodiment, for the switch between the rows, three angle parameters are necessary, and for the switch between the columns, three angle parameters are further necessary. Thus, with respect to a 4×4 block, six angle parameters are necessary.

Referring to FIG. 11B, according to an exemplary embodiment, for the switch between the rows, six angle parameters are necessary, and for the switch between the columns, six angle parameters are further necessary. Thus, with respect to an 8×8 block, twelve angle parameters are necessary.

The apparatus 900 for encoding an image may perform the ROT according to following operations:
Step 1—Orthogonal transform family parameterization
Step 2—Monte Carlo method
Step 3—Lehmer's pseudo-random numbers
Step 4—Localization of diapason for optimal angle parameters
Step 5—Quasi-optimal basis Although a compression rate of an image is improved by using the ROT, if too many parameters are added, transmission of a video signal may achieve a better result than compression. In other words, there is a trade-off between the compression ratio and the overhead of additional parameters. For example, although an image signal in a 4×4 frequency coefficient matrix is compressed to a size near 0, if the compression requires sixteen additional parameters, it may not be necessary to perform the ROT. In this regard, it may be more efficient to transmit sixteen pixel values to a decoder. Thus, both of compression of an image signal, and minimization of an added overhead are important.

For this, the ROT performer 1030 searches for an optimal angle parameter while minimizing an overhead according to following operations.

Operation 1

Orthogonal Transform Family Parameterization

In order to choose the optimal transform for current data according to an exemplary embodiment, basis adjustment is required. The rotation of basis is chosen as basis modification. Accordingly, the set of rotational angles describes basis modification uniquely.

Introduced rotational angles describe basis modification by the same way that Euler's angles describe the rotation of solid body in 3D space. This similarity explains the name of this algorithm.

In order to revise the basis, rotation of the basis is mainly selected. In the one or more exemplary embodiments, the rotation of the basis is performed by using an angle parameter. Here, the rotation of the basis, which is performed by using the angle parameter, is used. The angle parameter may be the Euler angle. However, the angle parameter is not limited to the Euler angle, and thus may include others that may indicate a level of a partial switch of one or more values between rows and between columns of a matrix. Hereinafter, an example involving using the Euler angle will now be described.

The rotation is defined as Equation 3 by using a left multiplication Rhorizontal and a right multiplication Rvertical of a first frequency coefficient matrix D.

$$D' = R_{horizontal} \times D \times R_{vertical} \qquad \text{Equation 3}$$

(D' indicates a second frequency coefficient matrix that is rotationally transformed.)

The matrix $R_{horizontal}$ performs a switch between rows of the first frequency coefficient matrix D. The matrix $R_{vertical}$ performs a switch between columns of the first frequency coefficient matrix D.

An ROT matrix is determined according to an angle parameter and an example of the matrix $R_{horizontal}$ in a 4×4 block is given by Equation 4. As described with reference to FIG. 11A, three angle parameters $\alpha_1$, $\alpha_2$, and $\alpha_3$ are used in a partial switch between rows and three angle parameters $\alpha_4$, $\alpha_5$, and $\alpha_6$ are used in a partial switch between columns.

$$R_{horizontal}(\alpha_1, \alpha_2, \alpha_3) = \begin{pmatrix} R_9 & R_{10} & R_{11} & 0 \\ R_{12} & R_{13} & R_{14} & 0 \\ R_{15} & R_{16} & R_{17} & 0 \\ 0 & 0 & 0 & 1 \end{pmatrix} \qquad \text{Equation 4}$$

$$R_{vertical}(\alpha_4, \alpha_5, \alpha_6) = \begin{pmatrix} R_0 & R_1 & R_2 & 0 \\ R_3 & R_4 & R_5 & 0 \\ R_6 & R_7 & R_8 & 0 \\ 0 & 0 & 0 & 1 \end{pmatrix}$$

$R_0 = \cos \alpha_4 \cos \alpha_6 - \sin \alpha_4 \cos \alpha_5 \sin \alpha_6$
$R_1 = -\sin \alpha_4 \cos \alpha_6 - \cos \alpha_4 \cos \alpha_5 \sin \alpha_6$
$R_2 = \sin \alpha_5 \sin \alpha_6$
$R_3 = \cos \alpha_4 \sin \alpha_6 + \sin \alpha_4 \cos \alpha_5 \cos \alpha_6$
$R_4 = -\sin \alpha_4 \sin \alpha_6 + \cos \alpha_4 \cos \alpha_5 \cos \alpha_6$
$R_5 = -\sin \alpha_5 \cos \alpha_6$
$R_6 = \sin \alpha_4 \sin \alpha_5$
$R_7 = \cos \alpha_4 \sin \alpha_5$
$R_8 = \cos \alpha_5$
$R_9 = \cos \alpha_1 \cos \alpha_3 - \sin \alpha_1 \cos \alpha_2 \sin \alpha_3$
$R_{10} = -\sin \alpha_1 \cos \alpha_3 - \cos \alpha_1 \cos \alpha_2 \sin \alpha_3$
$R_{11} = \sin \alpha_2 \sin \alpha_3$
$R_{12} = \cos \alpha_1 \sin \alpha_3 + \sin \alpha_1 \cos \alpha_2 \cos \alpha_3$
$R_{13} = -\sin \alpha_1 \sin \alpha_3 + \cos \alpha_1 \cos \alpha_2 \cos \alpha_3$
$R_{14} = \sin \alpha_2 \cos \alpha_3$
$R_{15} = \sin \alpha_1 \sin \alpha_2$
$R_{16} \cos \alpha_1 \sin \alpha_2$
$R_{17} = \cos \alpha_2$ In Equation 4, $\alpha_1$, $\alpha_2$, $\alpha_3$, $\alpha_4$, $\alpha_5$, and $\alpha_6$ indicate the Euler angles.

Thus, with respect to a 4×4 frequency coefficient matrix, the Euler angles describe revision of fifteen frequency coefficients by a group of six parameters of $\alpha_1$, $\alpha_2$, ..., and $\alpha_6$. With respect to a 8×8 frequency coefficient matrix, twelve Euler angles $\alpha_1$, $\alpha_2$, ..., and $\alpha_{12}$ describe revision of sixty frequency coefficients. When ROT is performed on a 8×8 frequency coefficient matrix, $R_{horizontal}$ and $R_{vertical}$ of Equation 3 may be defined as in Equation 5.

$$R_{horizontal}(\alpha_1, \alpha_2, \alpha_3, \alpha_4, \alpha_5, \alpha_6) = \qquad \text{Equation 5}$$

$$\begin{pmatrix} R_9 & R_{10} & R_{11} & 0 & 0 & 0 & 0 & 0 \\ R_{12} & R_{13} & R_{14} & 0 & 0 & 0 & 0 & 0 \\ R_{15} & R_{16} & R_{17} & 0 & 0 & 0 & 0 & 0 \\ 0 & 0 & 0 & R_{27} & R_{28} & R_{29} & 0 & 0 \\ 0 & 0 & 0 & R_{30} & R_{31} & R_{32} & 0 & 0 \\ 0 & 0 & 0 & R_{33} & R_{34} & R_{35} & 0 & 0 \\ 0 & 0 & 0 & 0 & 0 & 0 & 1 & 0 \\ 0 & 0 & 0 & 0 & 0 & 0 & 0 & 1 \end{pmatrix}$$

-continued $R_{vertical}(\alpha_7, \alpha_8, \alpha_9, \alpha_{10}, \alpha_{11}, \alpha_{12}) =$ $$\begin{pmatrix} R_0 & R_1 & R_2 & 0 & 0 & 0 & 0 & 0 \\ R_3 & R_4 & R_5 & 0 & 0 & 0 & 0 & 0 \\ R_6 & R_7 & R_8 & 0 & 0 & 0 & 0 & 0 \\ 0 & 0 & 0 & R_{18} & R_{19} & R_{20} & 0 & 0 \\ 0 & 0 & 0 & R_{21} & R_{22} & R_{23} & 0 & 0 \\ 0 & 0 & 0 & R_{24} & R_{25} & R_{26} & 0 & 0 \\ 0 & 0 & 0 & 0 & 0 & 0 & 1 & 0 \\ 0 & 0 & 0 & 0 & 0 & 0 & 0 & 1 \end{pmatrix}$$

$R_0 = \cos \alpha_7 \cos \alpha_9 - \sin \alpha_7 \cos \alpha_8 \sin \alpha_9$
$R_1 = -\sin \alpha_7 \cos \alpha_9 - \cos \alpha_7 \cos \alpha_8 \sin \alpha_9$
$R_2 = \sin \alpha_8 \sin \alpha_9$
$R_3 = \cos \alpha_7 \sin \alpha_9 + \sin \alpha_7 \cos \alpha_8 \cos \alpha_9$
$R_4 = -\sin \alpha_7 \sin \alpha_9 + \cos \alpha_7 \cos \alpha_8 \cos \alpha_9$
$R_5 = -\sin \alpha_8 \cos \alpha_9$
$R_6 = \sin \alpha_7 \sin \alpha_8$
$R_7 = \cos \alpha_7 \sin \alpha_8$
$R_8 = \cos \alpha_8$
$R_9 = \cos \alpha_1 \cos \alpha_3 - \sin \alpha_1 \cos \alpha_2 \sin \alpha_3$
$R_{10} = -\sin \alpha_1 \cos \alpha_3 - \cos \alpha_1 \cos \alpha_2 \sin \alpha_3$
$R_{11} = \sin \alpha_2 \sin \alpha_3$
$R_{12} = \cos \alpha_1 \sin \alpha_3 + \sin \alpha_1 \cos \alpha_2 \cos \alpha_3$
$R_{13} = -\sin \alpha_1 \sin \alpha_3 + \cos \alpha_1 \cos \alpha_2 \cos \alpha_3$
$R_{14} = \sin \alpha_2 \cos \alpha_3$
$R_{15} = \sin \alpha_1 \sin \alpha_2$
$R_{16} = \cos \alpha_1 \sin \alpha_2$
$R_{17} = \cos \alpha_2$
$R_{18} = \cos \alpha_{10} \cos \alpha_{12} - \sin \alpha_{10} \cos \alpha_{11} \sin \alpha_{12}$
$R_{19} = -\sin \alpha_{10} \cos \alpha_{12} - \cos \alpha_{10} \cos \alpha_{11} \sin \alpha_{12}$
$R_{20} = \sin \alpha_{11} \sin \alpha_{12}$
$R_{21} = \cos \alpha_{10} \sin \alpha_{12} + \sin \alpha_{10} \cos \alpha_{11} \cos \alpha_{12}$
$R_{22} = -\sin \alpha_{10} \sin \alpha_{12} + \cos \alpha_{10} \cos \alpha_{11} \cos \alpha_{12}$
$R_{23} = -\sin \alpha_{11} \cos \alpha_{12}$
$R_{24} = \sin \alpha_{10} \sin \alpha_{11}$
$R_{25} = \cos \alpha_{10} \sin \alpha_{11}$
$R_{26} = \cos \alpha_{11}$
$R_{27} = \cos \alpha_4 \cos \alpha_6 - \sin \alpha_4 \cos \alpha_5 \sin \alpha_6$
$R_{28} = -\sin \alpha_4 \cos \alpha_6 - \cos \alpha_4 \cos \alpha_5 \sin \alpha_6$
$R_{29} = \sin \alpha_5 \sin \alpha_6$
$R_{30} = \cos \alpha_4 \sin \alpha_6 + \sin \alpha_4 \cos \alpha_5 \cos \alpha_6$
$R_{31} = -\sin \alpha_4 \sin \alpha_6 + \cos \alpha_4 \cos \alpha_5 \cos \alpha_6$
$R_{32} = -\sin \alpha_5 \cos \alpha_6$
$R_{33} = \sin \alpha_4 \sin \alpha_5$
$R_{34} = \cos \alpha_4 \sin \alpha_5$
$R_{35} = \cos \alpha_5$ Operation 2

Monte Carlo Method

After a degree of freedom is decreased to six angle parameters (twelve angle parameters in the case of the 8×8 frequency coefficient matrix), it is necessary to check an optimization matter in consideration of saving bits according to an exemplary embodiment. That is, it is necessary to optimize a method of selecting a group of angle parameters.

The optimization has a difficulty in that a high-dimensional domain of a parameter (six or twelve angle parameters) is used, and compression of an image is non-smoothly dependent on used parameters. In general, the difficulty is solved by using the Monte Carlo method.

The core of the Monte Carlo method is to perform a plurality of attempts. That is, a compression rate is measured from several points, and then a best point therefrom is selected. In the Monte Carlo method, a quality of a random point in a multi-dimensional domain is highly important (in particular, the quality is more important according to elevation of a dimension). A pseudo-random point is preferred to a uniform grid point. This will be described in FIG. 15 with reference to a two-dimensional (2D) case.

Figure 15:
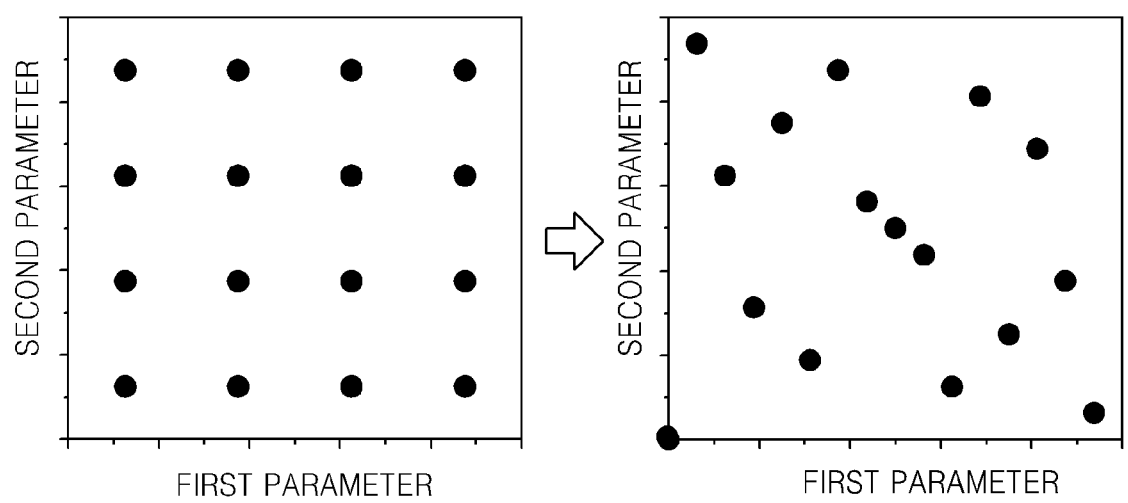
FIG. 15 illustrates pseudo-random points according to an exemplary embodiment.

FIG. 15 illustrates pseudo-random points according to another exemplary embodiment.

A left diagram of FIG. 15 illustrates uniform grid points, and a right diagram of FIG. 15 illustrates first sixteen points according to a pseudo-random process.

In a case where the uniform grid points are used, despite sixteen points of the Monte Carlo method, only four different values are checked with respect to a first parameter (and a second parameter). On the other hand, in a case where the pseudo-random points are used, sixteen different values are checked with respect to a first parameter (and a second parameter) by sixteen points. That is, when the pseudo-random points are used, various values of the first and second parameters are sufficiently checked with respect to sixteen points. In particular, with respect to the Monte Carlo method, the use of the pseudo-random points is more advantageous than the use of the uniform grid points, according to an increase of the number of parameters.

Operation 3

Lehmer's Pseudo-Random Numbers

A pseudo-random sequence may be generated by using various methods according to one or more exemplary embodiments. One of the most efficient methods is to use a Lehmer number. This is an artificially generated sequence, and is close to actual random numbers that are uniformly distributed. An algorithm for generating a Lehmer sequence is well known, and thus a detailed description thereof is omitted here. According to an exemplary embodiment, at least $10^{13}$ unrepeated points are provided. The Lehmer sequence is an artificial sequence, and the algorithm for generating the Lehmer sequence is well known, so that a decoder may easily recalculate it.

By using the Lehmer sequence, a combination of angle parameters may be coded by using one information (that is, a number in a random sequence). In a six-dimensional (in the case of a 4×4 frequency coefficient matrix) or twelve-dimensional (in the case of an 8×8 frequency coefficient matrix) parameter domain, random points corresponding to the combination of the angle parameters are generated, a compression rate is measured after compression is performed by using the random points, and then an optimal parameter point is selected. Instead of storing or transmitting the combination of the angle parameters, a number of the Lehmer sequence corresponding to the optimal parameter point is stored or transmitted.

If an ROT is performed on $2^p$ points, that is, combination of angle parameters in the Monte Carlo method, only p bits of information are included as an overhead.

Operation 4

Localization of Diapason for Optimal Angle Parameters

According to one or more exemplary embodiments, an optimal rotation angle has a value near 0 degrees or 180 degrees Or radian). This indicates that a basis for a transform to a frequency domain, e.g., a DCT basis or a KLT basis is almost optimized.

Thus, angle parameters according to the one or more exemplary embodiments are only used to perform a partial switch (an angle near 0 degrees in the case of the Euler angles) of one or more values between rows and between columns, or to perform the partial switch, and a change (an angle near 180 degrees in the case of the Euler angles) of a sign of a basis element. That is, a diapason of parameters used in the one or more exemplary embodiments is limited to a specific part of a domain, and this limitation is referred to as localization.

By performing the localization on the diapason of the parameters, the number of bits with respect to an overhead is decreased. If it is assumed that points to be checked are limited to a specific part in FIG. 15, the number of points to be checked so as to search for optimal combination of the angle parameters is decreased.

Also, if the number of points to be checked is fixed (that is, in a case where the number of bits used as overheads is fixed), and the localization is applied, more points in a smaller angle may be checked so that a compression rate may be increased.

Operation 5

Quasi-Optimal Basis

By performing the aforementioned steps 1 through 4, it is possible to select an optimal basis with respect to all blocks (blocks having a size equal to or greater than 4×4 and 8×8) according to an exemplary embodiment. An overhead having 8 or 10 bytes may be added to each block in a high bit rate. When a bit rate is decreased, it is preferred to select a quasi-optimal basis.

The quasi-optimal basis indicates that the same rotation is applied to a group of all transform units or some of the transform units included in a slice or a picture. If optimal rotation is applied to each block, a compression rate with respect to an image is increased but an overhead is also increased.

In order to determine which unit from among a transform unit, a group of transform units, a slice, and a picture is applied the same rotation, various experiments may be performed.

After a transform to a frequency domain at a low bit rate, a quantization coefficient value in many parts of a frequency coefficient matrix becomes 0. Thus, with respect to the parts of the frequency coefficient matrix, it is not necessary to perform the ROT and to transmit additional information regarding a rotation angle value.

The apparatus 900 for encoding an image according to an exemplary embodiment performs the ROT on a combination of a plurality of angle parameters by using the Monte Carlo method, and repeatedly performs quantization and entropy encoding, thereby determining optimal combination of the angle parameters. Also, the image encoding apparatus 900 does not encode the angle parameters but encodes a Lehmer's pseudo-random sequence number as information regarding the determined optimal combination of the angle parameters. Here, by using the localization and the quasi-optimal basis, the information regarding the angle parameters may be encoded at a higher efficiency.

Figure 16:
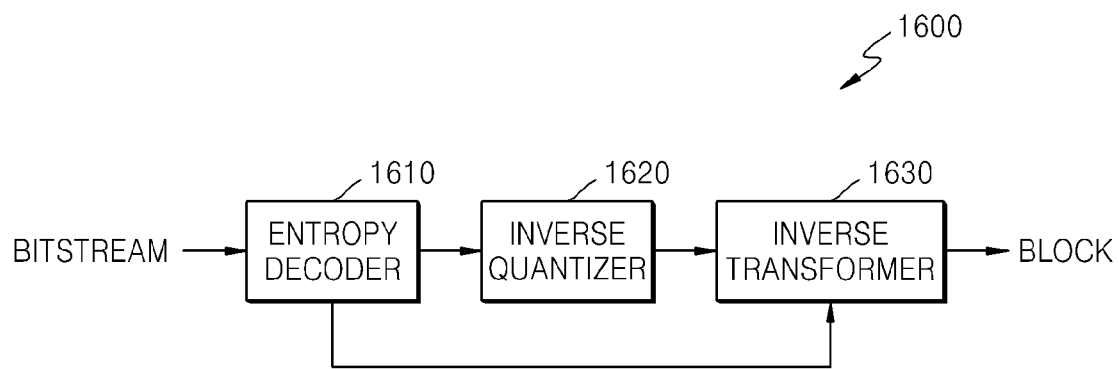
FIG. 16 is a block diagram of an apparatus for decoding an image, according to another embodiment.

FIG. 16 is a block diagram of an apparatus 1600 for decoding an image, according to another exemplary embodiment.

The apparatus 1600 for decoding an image illustrated in FIG. 16 may be a module, which is included in the apparatus 200 for decoding an image illustrated in FIG. 2 or the image decoder 500 illustrated in FIG. 5, for performing the following image decoding processes. Referring to FIG. 16, the apparatus 1600 for decoding an image includes an entropy decoder 1610, an inverse quantizer 1620, and an inverse transformer 1630.

The entropy decoder 1610 receives a bitstream and entropy-decodes a second frequency coefficient matrix of a predetermined block. The second frequency coefficient matrix is a matrix generated by performing ROT on the first frequency coefficient matrix generated by transforming the predetermined block to a frequency domain. Also, the entropy decoder 1610 may decode information about angle parameters used in ROT for inverse ROT. The information about angle parameters may be information about inverse ROT matrix 'idx' or 'ROT_index' used in inverse ROT of a current block. Entropy decoding is performed according to a CABAC method or a CAVLC method as in the entropy encoder 930.

The inverse quantizer 1620 inverse quantizes the second frequency coefficient matrix entropy-decoded in the entropy decoder 1610. Inverse quantization is performed according to quantization steps used in encoding.

The inverse transformer 1630 generates the first frequency coefficient matrix by performing inverse ROT on the second frequency coefficient matrix and performs inverse transform on the first frequency coefficient matrix. A ROT matrix used in inverse ROT of a current block is selected based on the information about the angle parameter entropy-decoded in the entropy decoder 1610, that is, information about 'idx' or 'ROT_index' and inverse ROT is performed on the second frequency coefficient matrix according to the selected ROT matrix. This will be described more fully with reference to FIG. 17.

Figure 17:
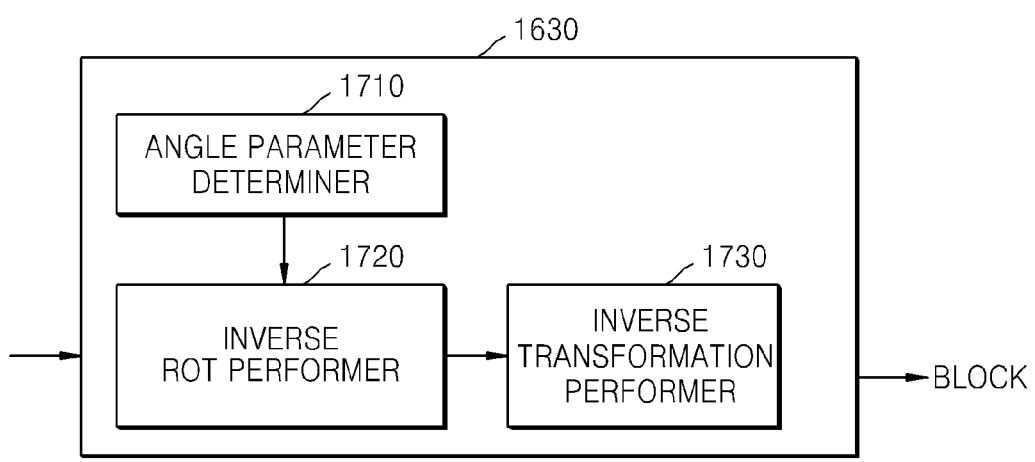
FIG. 17 is a block diagram of an inverse transformer, according to an exemplary embodiment.

FIG. 17 is a block diagram of the inverse transformer 1630 of FIG. 16, according to an exemplary embodiment.

Referring to FIG. 17, the inverse transformer 1630 includes an angle parameter determiner 1710, an inverse ROT performer 1720, and an inverse transform performer 1730.

The angle parameter determiner 1710 determines a ROT matrix to be used in inverse ROT based on information about angle parameters, that is, 'idx' or 'ROT_index'.

The ROT matrix to be used in the inverse ROT maybe determined according to whether the current block is an intra or inter predicted block and an intra prediction direction. The ROT matrix to be used in the inverse ROT is finally determined according to whether the current block is an intra or inter predicted block and an intra prediction direction with reference to information about the angle parameter entropy-decoded in the entropy decoder 1610, that is information about 'ROT_index'. This will be described more fully with reference to FIGS. 12A through 12I.

FIGS. 12A through 12I illustrate the ROT matrices according to an exemplary embodiment.

FIGS. 12A through 12I illustrate the ROT matrices according to an angle parameter used in inverse ROT of the second frequency coefficient matrix. The ROT matrices of FIGS. 12A through 12I may be inverse matrices of $R_{horizontal}$ and $R_{vertical}$ multiplied to a left side and a right side of the second frequency coefficient matrix for inverse ROT. Each row classified by 'ROT_idx' may be filled with ninety-six values. From the values, first thirty-two are values for matrices of $R_{horizontal}$ and $R_{vertical}$ used in 4×4 inverse ROT and remaining sixty-four are values for matrices of $R_{horizontal}$ and $R_{vertical}$ used in 8×8 inverse ROT.

The angle parameter determiner 1710 may determine one of twenty-seven ROT matrices. The ROT matrix may be determined according to whether the current block is an intra or inter predicted block and an intra prediction direction.

For example, when the current block is not predicted according to intra prediction or is not intra predicted in a first direction (for example, a vertical direction) or a second direction (for example, a horizontal direction), one of the ROT matrices where 'ROT_index' is in the first range (for example, range of 0 to 8) may be selected. However, when the current block is intra predicted and the intra prediction direction is the first direction, one of the ROT matrices where 'ROT_index' is in the second range (for example, range of 9 to 17) may be selected. Also, when the current block is intra predicted and the intra prediction direction is the second direction, one of the ROT matrices where 'ROT_index' is in the third range (for example, range of 18 to 26) may be selected.

When the current block is intra predicted in a first direction, one of the ROT matrices where 'ROT_index' is in the second range (for example, range of 9 to 17) is selected by adding a predetermined value (for example, 9) to 'ROT_index' in the first range (for example, range of 0 to 8) entropy-decoded in the entropy decoder 1610. When the current block is intra predicted in a second direction, one of the ROT matrices where 'ROT_index' is in the third range (for example, range of 18 to 26) is selected by adding a predetermined value (for example, 18) to 'ROT_index' in the first range (for example, range of 0 to 8) entropy-decoded in the entropy decoder 1610

FIGS. 20A and 20B illustrate ROT matrices according to another exemplary embodiment.

FIG. 20A illustrates values of ROT matrices that correspond to information about a plurality of angle parameters, that is, INV_ROT_4[idx][k], when the second frequency coefficient matrix is 4×4. Here, 'idx' corresponds to the information about angle parameters and 'k' corresponds to values of first columns in FIG. 20A.

FIG. 20B illustrates values of ROT matrices that correspond to information about a plurality of angle parameters, that is, INV_ROT_8[idx][k], when the second frequency coefficient matrix is 8×8. Here, idx' corresponds to the information about angle parameters and 'k' corresponds to values of first columns in FIG. 20B. Inverse ROT based on FIGS. 20A and 20B will be described in relation to the inverse ROT performer 1720.

The inverse ROT performer 1720 performs inverse ROT on an inverse quantized second frequency coefficient matrix received from the inverse quantizer 1620. The ROT described with reference to FIGS. 11A through 11C is inversely performed. Here, inverse ROT may be performed according to the ROT matrix selected from the angle parameter determiner 1710. Partial switching between at least one of the rows and columns of the second frequency coefficient matrix is performed based on the ROT matrix selected from the angle parameter determiner 1710, thereby generating the first frequency coefficient matrix. Inverse ROT is performed according to the ROT matrix selected as in Equation 6 for inverse ROT.

$$D = R_{horizontal}^{-1} \times D' \times R_{vertical}^{-1} \quad \text{Equation 6}$$

D' is an inverse quantized second frequency coefficient matrix input to the inverse ROT performer 1720, $R_{horizontal}^{-1}$ is a ROT matrix for partial switching between rows when inverse ROT is performed, and $R_{vertical}^{-1}$ is a ROT matrix for partial switching between columns when inverse ROT is performed. $R_{horizontal}^{-1}$ and $R_{vertical}^{-1}$ may be defined by Equation 7.

$$R_{horizontal}^{-1} = R_{horizontal}^{T}$$

$$R_{vertical}^{-1} = R_{vertical}^{T} \quad \text{Equation 7}$$

$R_{horizontal}^{-1}$ and $R_{vertical}^{-1}$ in Equation 7 may be $R_{horizontal}$ and $R_{vertical}$ described in relation to Equation 4 or Equation 5.

In other words, $R_{horizontal}^{-1}$ and $R_{vertical}^{-1}$ may be ROT matrices where transposed matrices of the $R_{horizontal}$ and $R_{vertical}$ described in relation to Equation 4 or Equation 5 are used in inverse ROT.

FIGS. 13A and 13B illustrate inverse ROT syntaxes according to an exemplary embodiment.

FIGS. 13A and 13B illustrate syntax for performing inverse ROT by using one of the ROT matrices of FIGS. 12A through 12I. FIG. 13A illustrates syntax for 4×4 inverse ROT and FIG. 13B illustrates syntax for 8×8 inverse ROT.

Referring to FIG. 13A, the inverse ROT performer 1720 performs inverse ROT on the second frequency coefficient matrix by selecting one of the ROT matrices of FIGS. 12A through 12I according to the angle parameter determined in the angle parameter determiner 1710.

As described above, when the current block is not predicted according to intra prediction or is not intra predicted in a first direction (for example, a vertical direction) or a second direction (for example, a horizontal direction), the inverse ROT is performed according to the ROT matrix corresponding to one of the 'ROT_index' in the first range (for example, range of 0 to 8). When the current block is intra predicted in the first direction, the inverse ROT is performed according to the ROT matrix corresponding to one of the 'ROT_index' in the second range (for example, range of 9 to 17). When the current block is intra predicted in the second direction, the inverse ROT is performed according to the ROT matrix corresponding to one of the 'ROT_index' in the third range (for example, range of 18 to 26). When the ROT matrix to be used in the inverse ROT is specified, rows of the current block are partially switched through a 'for (n=0;n<13;n+4)' loop and columns of the current block are partially switched through a 'for (n=0;n<4;n++)' loop.

The inverse ROT performer 1720 may perform inverse ROT on the second frequency coefficient matrix based on the ROT matrix of the 'ROT_index' in one of the first through third ranges selected in the angle parameter determiner 1710 based on whether the current block is predicted according to intra prediction and an intra prediction direction.

The rows for the values of the second frequency coefficient matrix defined to r[x, y] through the 'for (n=0;n<13;n+4)' loop are partially switched, thereby generating 'temp [n]', 'temp [n+1]', 'temp [n+2]' and 'temp[n+3]'. In the 'for (n=0; n<13;n+4)' loop, n is 0, 4, 8, and 12.

Then, the columns for the values of temp[n]', 'temp[n+4]' and 'temp [n+8]' are partially switched through the 'for (n=0; n<4;n++)' loop, thereby generating values of the first frequency coefficient matrix defined to the r'[x, y]. In the 'for (n=0;n<4;n++)' loop, n is 0, 1, 2, and 3.

'ROT_MATRIX[p][q]' denotes $q^{th}$ value of the rotational matrix, which is a predetermined 'ROT_index=p', from among the matrices illustrated in FIGS. 12A through 12I, and 'ROT_SCALE' may be '8192'.

Referring to FIG. 13B, the inverse ROT performer 1720 partially switches the rows of the second frequency coefficient matrix through the 'for (n=0;n<64;n+8)' loop and partially switches the columns of the second frequency coefficient matrix through the 'for (n=0;n<8;n++)' loop.

When ROT is performed on the matrix 1120 including only some of coefficients of the first frequency coefficient matrix 1110, inverse ROT is performed on the matrix 1120, thereby generating the first frequency coefficient matrix 1110.

FIGS. 21A and 21B illustrate inverse ROT syntaxes according to another exemplary embodiment.

FIGS. 21A and 21B illustrate syntax for performing inverse ROT by using one of the ROT matrices of FIGS. 20A and 20B. FIG. 21A illustrates syntax for 4×4 inverse ROT and FIG. 21B illustrates syntax for 8×8 inverse ROT.

Referring to FIG. 21A, the inverse ROT performer 1720 performs inverse ROT on the second frequency coefficient matrix by selecting one of the ROT matrices of FIG. 20A according to the angle parameter determined in the angle parameter determiner 1710.

The rows of the second frequency coefficient matrix are partially switched through the 'for (j=0;j<4;j++)' loop and the columns of the second frequency coefficient matrix are partially switched through the 'for (i=0;i<4;i++)' loop.

The values of the second frequency coefficient matrix defined as 'S' values are partially switched through the 'for (j=0;j<4;j++)' loop, thereby generating 't' values. INV_ROT_4[idx][k] corresponding to 'idx', that is, an information about the angle parameter entropy-decoded from among the ROT matrices is used to generate T values. However, the values in FIG. 20A are 8-bit values. When 'S' is multiplied by the 8-bit values and T values are generated, an overflow may be generated in a calculation of the 'for (i=0; i<4;i++)' loop. Accordingly, the generated 't' values are bit shifted so as to reduce an absolute value.

However, when INV_ROT_4[idx][k] is bit shifted by a number of bits and thus 'S' values are the same as the number of bits of the 't' values, accuracy of operation may be decreased. Accordingly, INV_ROT_4[idx][k] is bit right-shifted by '8-shift', which is smaller than 8 bits, and the T values are generated. 'shift' is a value, in which an overflow is not generated in calculation of the 'for (i=0;i<4;i++)' loop and accuracy of ROT operation maintains, and may be defined by Equation 8.

shift=Min(Max(0,4−increased_bit_depth_luma),8)  Equation 8

In Equation 8, 'increased_bit_depth_luma' is a value internally added for accuracy of operation of a luminance value and may be an internal bit depth increasing (IBDI) bit. Equation 8 is described with a luminance value as an example. However, it would have been obvious to one of ordinary skill in the art to define 'shift' in the same manner as above in operation of a chroma value.

Since 'shift' may be determined in consideration of IBDI, although bit depth increases due to INV_ROT_4[idx][k] in the 'for (j=0;j<4;j++)' loop, an overflow may not be generated in the 'for (i=0;i<4;i++)' loop and accuracy of ROT operation increases.

In the 'for (i=0;i<4;i++)' loop, the 't' values generated in the 'for (j=0;j<4;j++)' loop are partially switched so as to generate values of the first frequency coefficient matrix defined to 'd' values. When partial switch is completed, the values are bit right-shifted by '8+shift' so as to match the 'd' values with the number of bits of the 'S' values. Here, in order to round the 'd' values, 'offset<<8' is added to the values and the added value is bit right-shifted by '8+shift'. 'offset' may be determined according to 'shift' used in the 'for (j=0;j<4; j++)' loop and thus may be determined as in Equation 9.

if(shift>0)offset=1<<(shift−1),otherwise offset=0  Equation 9

Referring to FIG. 21B, the inverse ROT performer 1720 performs inverse ROT on the second frequency coefficient matrix by selecting one of the ROT matrices of FIG. 20B according to the angle parameter determined in the angle parameter determiner 1710.

The rows of the second frequency coefficient matrix are partially switched through the 'for (j=0;j<8;j++)' loop and the columns of the second frequency coefficient matrix are partially switched through the 'for (i=0;i<8;i++)' loop.

FIG. 21B is different from FIG. 21A in that a size of the second frequency coefficient matrix increases to 8×8, and 'shift' and 'offset' may be determined according to Equation 7 and Equation 8 as in FIG. 21A.

The inverse transform performer 1730 receives the first frequency coefficient matrix from the inverse ROT performer 1720 and performs inverse transform on the received first frequency coefficient matrix. DCT or KLT is inversely performed so as to perform inverse transform the first frequency coefficient matrix. As a result of the inverse transform, a predetermined block of a pixel domain is restored.

Figure 18:
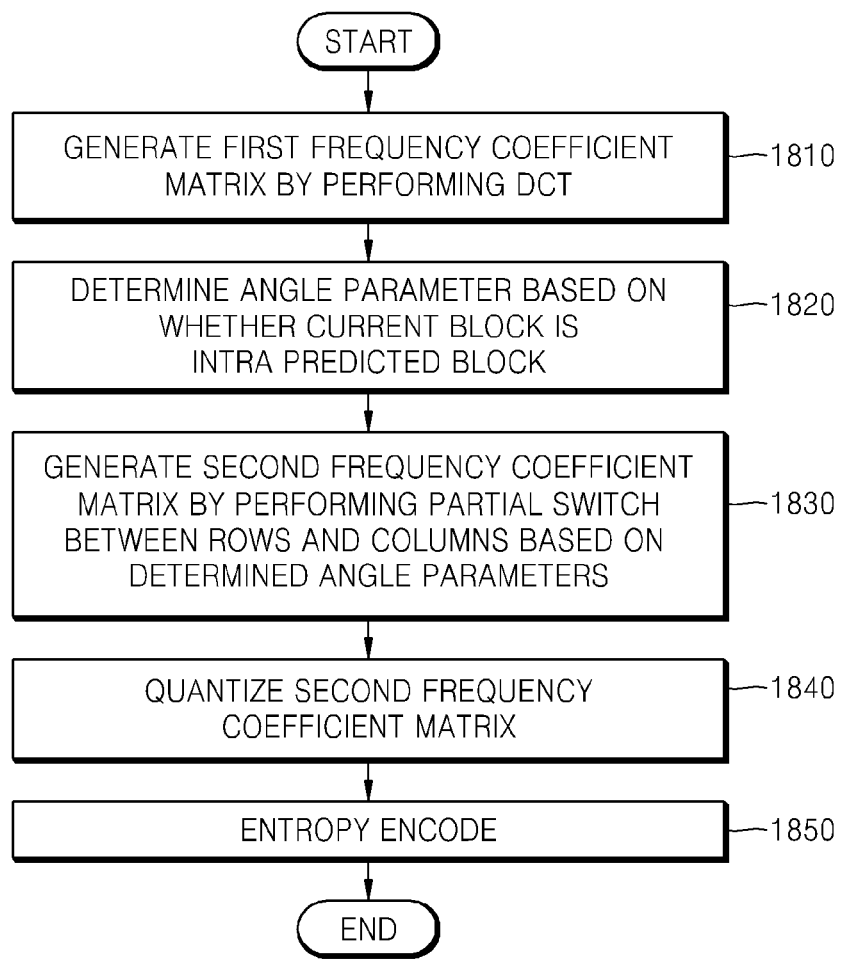
FIG. 18 is a flowchart of a method of encoding an image, according to an exemplary embodiment.

FIG. 18 is a flowchart of a method of encoding an image, according to an exemplary embodiment.

Referring to FIG. 18, in operation 1810, an apparatus for encoding an image generates a first frequency coefficient matrix by transforming a current block to a frequency domain. The apparatus for encoding an image receives the current block, performs DCT or KLT or any other fixed point spatial transform, and thus generates the first frequency coefficient matrix including spatial transform coefficients.

In operation 1820, the apparatus for encoding an image determines an angle parameter used in ROT of the first frequency coefficient matrix. The angle parameter may be idx' or 'ROT_idx'.

idx' is determined based on result obtained by repeatedly performing the encoding for a plurality of times.

'ROT_idx' is determined based on whether the current block is intra or inter predicted block. Different ROT matrices may be selected according to the case when the current block is intra predicted and the case when the current block is inter predicted. When the current block is intra predicted, different ROT matrices may be selected according to the intra prediction direction of the current block. In other words, ROT matrices corresponding to the 'ROT_index' in the range of 0-8, 9-17, or 18-26 of FIGS. 12A through 12I may be selected based on whether the current block is an intra predicted block and an intra prediction direction. The ROT matrices may be $R_{horizontal}$ and $R_{vertical}$ described in relation to Equation 3.

In operation 1830, the apparatus for encoding an image performs a partial switch between at least one of rows and columns of the first frequency coefficient matrix based on the angle parameter determined in operation 1820 and generates a second frequency coefficient matrix. ROT is performed on the first frequency coefficient matrix based on the ROT matrices determined according to whether the current block is intra predicted block and an intra prediction direction in operation 1820.

When the first frequency coefficient matrix has a large size (e.g., a size equal to or greater than 16×16), a matrix including only some sampled coefficients of the first frequency coefficient matrix may be selected and ROT may be performed on only the selected matrix. When the matrix including only some sampled coefficients is selected, a matrix including only coefficients of low-frequency components may be selected.

In operation 1840, the apparatus for encoding an image quantizes the second frequency coefficient matrix generated in operation 1830. The second frequency coefficient matrix is quantized according to a predetermined quantization step.

In operation 1850, the apparatus for encoding an image entropy-encodes the second frequency coefficient matrix quantized in operation 1840. Entropy encoding is performed according to a CABAC method or a CAVLC method. Also, the apparatus for encoding an image entropy-encodes information about angle parameters used to partial switch at least one of rows and columns of the first frequency coefficient matrix, in operation 1850. Information about 'idx' pr 'ROT_index' for specifying one matrix used in inverse ROT from among the ROT matrices of FIGS. 12A through 12I is entropy-encoded. When the apparatus for encoding an image entropy-encodes only the 'ROT_index' in the first range (for example, range of 0 to 8), inverse ROT may be performed on the ROT matrices by using 'ROT_index' in the second range (for example, range of 9 to 17) or the third range (for example, range of 18 to 26) in the decoding side according to whether the current block is predicted according to intra prediction and an intra prediction direction.

Figure 19:
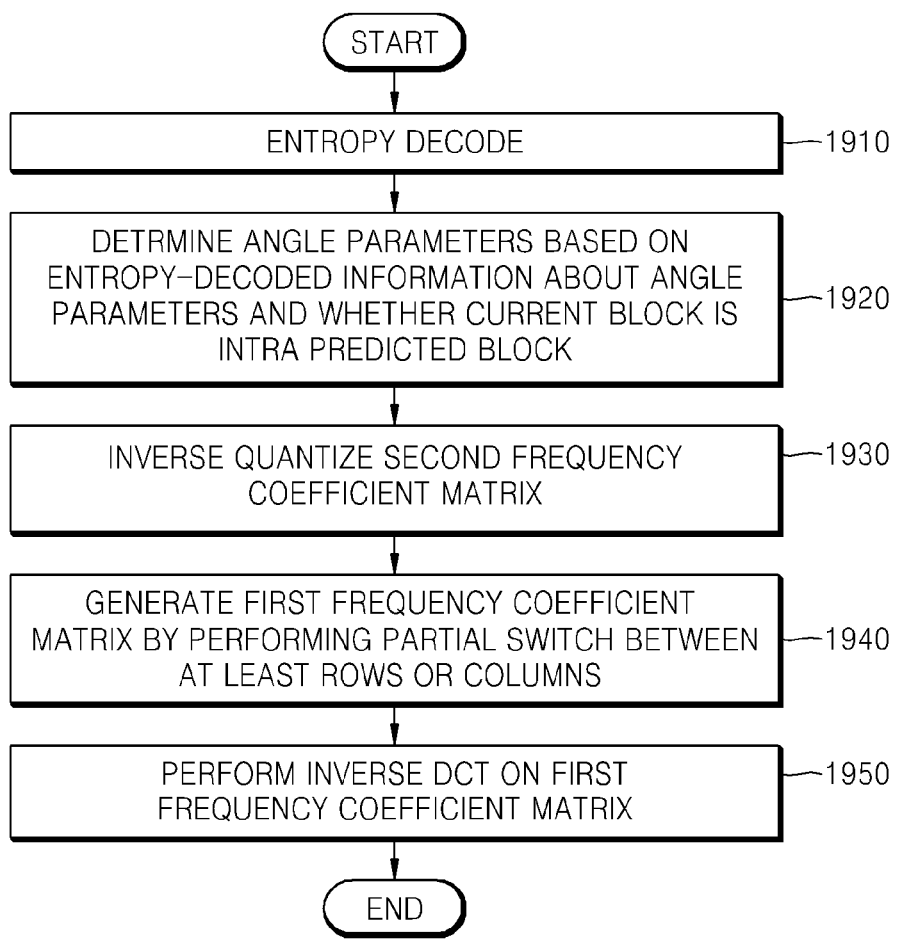
FIG. 19 is a flowchart of a method of decoding an image, according to an exemplary embodiment.

FIG. 19 is a flowchart of a method of decoding an image, according to an exemplary embodiment.

Referring to FIG. 19, in operation 1910, an apparatus for decoding an image receives a bitstream of a current block and entropy-decodes information about angle parameters and a second frequency coefficient matrix. The second frequency coefficient matrix is a matrix obtained by rotational transforming all or a part of the first frequency coefficient matrix. The information about angle parameters may be information about 'idx' or 'ROT_index'.

In operation 1920, the apparatus for decoding an image determines angle parameters used to perform inverse ROT on the second frequency coefficient matrix based on information about angle parameters entropy-decoded in operation 1910.

The angle parameters may be determined according to whether the current block is intra predicted block and an intra prediction direction. When the current block is intra predicted in a vertical direction or a horizontal direction, ROT matrices corresponding to 'ROT_index' in different ranges are selected. When the current block is intra predicted in a vertical direction, a ROT matrix corresponding to 'ROT_index' obtained by adding a predetermined value (for example, 9) to the entropy-decoded 'ROT_index' may be selected. When the current block is intra predicted in a horizontal direction, a ROT matrix corresponding to 'ROT_index' obtained by adding a predetermined value (for example, 18) to the entropy-decoded 'ROT_index' may be selected.

In operation 1930, the apparatus for decoding an image inverse quantizes the second frequency coefficient matrix. The second frequency coefficient matrix is inverse quantized according to a predetermined quantization step used in image encoding.

In operation 1940, the apparatus for decoding an image performs a partial switch between at least one of rows and columns of the second frequency coefficient matrix inverse quantized in operation 1930 and generates the first frequency coefficient matrix. According to the angle parameters determined in operation 1920, inverse ROT is performed on the second frequency coefficient matrix. Inverse ROT may be performed on the second frequency coefficient matrix based on the ROT matrix selected according to whether the current block is intra predicted and an intra prediction direction in operation 1920.

In the encoding process according to an exemplary embodiment as described above, when ROT is performed on a matrix including only some sampled coefficients of the first frequency coefficient matrix, the first frequency coefficient matrix is generated by performing inverse ROT on the matrix including only some sampled coefficients.

In operation 1950, the apparatus for decoding an image performs inverse transform on the first frequency coefficient matrix generated in operation 1940. The apparatus for decoding an image restores a block of a pixel domain by performing inverse DCT or KLT or any other fixed point inverse spatial transform on the first frequency coefficient matrix.

As described above, according to exemplary embodiments, a frequency coefficient matrix may be encoded strongly based on mathematics at a high compression ratio and thus an overall image compression ratio may be greatly increased.

While exemplary embodiments have been particularly shown and described above, it will be understood by one of ordinary skill in the art that various changes in form and details may be made therein without departing from the spirit and scope of the inventive concept as defined by the following claims and their equivalents. Also, an exemplary embodiment can be embodied as computer readable codes on a computer readable recording medium.

For example, the apparatus for encoding an image according to an exemplary embodiment, the apparatus for decoding an image according to an exemplary embodiment, the image encoder and the image decoder illustrated in FIGS. 1, 2, 4, 5, 9, 10, 16, and 17 may include a bus coupled to every unit of the apparatus or coder, at least one processor that is connected to the bus and is for executing commands, and memory connected to the bus to store the commands, received messages, and generated messages.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of encoding an image, the method comprising:
performing discrete cosine transform (DCT) on a current block to generate a first frequency coefficient matrix;
determining an angle parameter based on whether the current block is intra predicted;
performing a partial switch between at least one of rows and columns of the first frequency coefficient matrix based on the determined angle parameter to generate a second frequency coefficient matrix;
quantizing the second frequency coefficient matrix; and
entropy-encoding the second frequency coefficient matrix and information about the angle parameter,
wherein the angle parameter indicates a degree of the partial switch between at least one of the rows and the columns of the first frequency coefficient matrix, and
wherein the determining the angle parameter comprises determining the angle parameter based on an intra prediction direction of the current block.

2. The method of claim 1, wherein the determining the angle parameter based on the intra prediction direction of the current block comprises selecting a first matrix for performing partial switching between the rows and selecting a second matrix for performing partial switching between the columns from among a plurality of matrices based on the intra prediction direction of the current block.

3. The method of claim 2, wherein the generating the second frequency coefficient matrix comprises multiplying a left side of the first frequency coefficient matrix by the selected first matrix and multiplying a right side of the first frequency coefficient matrix by the selected second matrix.

4. The method of claim 1, wherein the angle parameter is a parameter for Euler angles.

5. A method of decoding an image, the method comprising:
entropy-decoding a second frequency coefficient matrix and information about an angle parameter;
determining the angle parameter based on the entropy-decoded information about the angle parameter and whether a current block is intra predicted;
inverse quantizing the entropy-decoded second frequency coefficient matrix;
performing a partial switch between at least one of rows and columns of the second frequency coefficient matrix based on the determined angle parameter to generate a first frequency coefficient matrix; and
performing inverse discrete cosine transform (IDCT) on the first frequency coefficient matrix to restore the current block,
wherein the predetermined angle parameter indicates a degree of partial switching between the at least one of the rows and the columns of the second frequency coefficient matrix, and
wherein the determining the angle parameter comprises determining the angle parameter based on an intra prediction direction of the current block.

6. The method of claim 5, wherein the determining the angle parameter based on the intra prediction direction of the current block comprises selecting a first matrix for performing partial switching between the rows and selecting a second matrix for performing partial switching between the columns from among a plurality of matrices based on the intra prediction direction of the current block.

7. The method of claim 6, wherein the generating the second frequency coefficient matrix comprises multiplying a left side of the second frequency coefficient matrix by the selected first matrix and multiplying a right side of the second frequency coefficient matrix by the selected second matrix.

8. The method of claim 5, wherein the angle parameter is a parameter for Euler angles.

9. An apparatus for encoding an image, the apparatus comprising:
a transformer which performs discrete cosine transform (DCT) on a current block to generate a first frequency coefficient matrix and which performs a partial switch between at least one of rows and columns of the first frequency coefficient matrix based on an angle parameter determined according to whether the current block is intra predicted to generate a second frequency coefficient matrix;
a quantizer which quantizes the second frequency coefficient matrix; and
an entropy encoder which entropy-encodes the second frequency coefficient matrix and information about the angle parameter,
wherein the angle parameter indicates a degree of partial switching between the at least one of the rows and the columns of the first frequency coefficient matrix, and
wherein the transformer determines the angle parameter based on an intra prediction direction of the current block.

10. The apparatus of claim 9, wherein the transformer selects a first matrix for performing partial switching between the rows and selects a second matrix for performing partial switching between the columns from among a plurality of matrices based on the intra prediction direction of the current block.

11. The apparatus of claim 10, wherein the transformer multiplies a left side of the first frequency coefficient matrix by the selected first matrix and multiplies a right side of the first frequency coefficient matrix by the selected second matrix.

12. The apparatus of claim 9, wherein the angle parameter is a parameter for Euler angles.

13. An apparatus for decoding an image, the apparatus comprising:
an entropy decoder which entropy-decodes a second frequency coefficient matrix and information about an angle parameter;
an inverse quantizer which inverse quantizes the entropy-decoded second frequency coefficient matrix; and
an inverse transformer which performs a partial switch between at least one of rows and columns of the second frequency coefficient matrix based on the angle parameter to generate a first frequency coefficient matrix, the angle parameter determined according to the entropy-decoded information about the angle parameter and whether a current block is intra predicted, and which performs inverse discrete cosine transform (IDCT) on the first frequency coefficient matrix to restore the current block,
wherein the angle parameter indicates a degree of partial switching between the at least one of the rows and the columns of the first frequency coefficient matrix, and
wherein the inverse transformer determines the angle parameter based on an intra prediction direction of the current block.

14. The apparatus of claim 13, wherein the inverse transformer selects a first matrix for performing partial switching between the rows and selects a second matrix for performing partial switching between the columns from among a plurality of matrices based on the intra prediction direction of the current block.

15. The apparatus of claim 14, wherein the inverse transformer multiplies a left side of the second frequency coefficient matrix by the selected first matrix and multiplies a right side of the second frequency coefficient matrix by the selected second matrix.

16. The apparatus of claim 13, wherein the angle parameter is a parameter for Euler angles.

17. A non-transitory computer readable recording medium having embodied thereon a computer program for executing the method of claim 1.

18. A non-transitory computer readable recording medium having embodied thereon a computer program for executing the method of claim 5.

* * * * *